(12) United States Patent
Ryan

(10) Patent No.: US 6,457,928 B1
(45) Date of Patent: Oct. 1, 2002

(54) INTER-ROW TRANSFER UNIT FOR MOVING TAPE CARTRIDGES BETWEEN ROWS OF LIBRARY SYSTEMS

(75) Inventor: Dennis M. Ryan, Redwood City, CA (US)

(73) Assignee: Ampex Corporation, Redwood City, CA (US)

(*) Notice: Subject to any disclaimer, the term of this patent is extended or adjusted under 35 U.S.C. 154(b) by 0 days.

(21) Appl. No.: 09/369,288

(22) Filed: Aug. 4, 1999

(51) Int. Cl.[7] ............................................... B65G 1/04
(52) U.S. Cl. .................. 414/281; 360/92; 414/788.4; 414/282; 414/273; 414/749.1; 414/277; 312/9.1; 710/100; 369/75.1
(58) Field of Search .................... 369/75.1; 414/273, 414/233, 278, 277, 281, 266, 788.4, 749.1; 710/100; 312/9.1; 360/92

(56) References Cited

U.S. PATENT DOCUMENTS

| | | | | |
|---|---|---|---|---|
| 4,588,341 A | * | 5/1986 | Motoda | 414/788.4 |
| 4,820,109 A | | 4/1989 | Witt | |
| 4,984,107 A | * | 1/1991 | Mondocea et al. | 360/92 |

FOREIGN PATENT DOCUMENTS

| | | | | |
|---|---|---|---|---|
| DE | 004314367 | * | 11/1993 | 360/92 |
| FR | 2610609 | * | 8/1988 | 414/281 |
| JP | 0104536 | * | 4/1989 | 414/788.4 |

OTHER PUBLICATIONS

Defensive Publication T887003 Bushnell, Jun. 1, 1971.*
World Class Performance In Data Storage And Management (Brochure) by SONY, Dated 1997. (10 Xerox Pages).
Automated Mixed–Media Livraries (Brochure) by EMASS Inc., Dated Aug., 1998. (12 Xerox Pages).

* cited by examiner

Primary Examiner—Frank E. Werner
(74) Attorney, Agent, or Firm—George B. Almeida; Ralph M. Mossino; Joel D. Talcott

(57) ABSTRACT

An easily installed inter-row transfer unit is disclosed employing a movable cartridge bin assembly suspended via linkage from a pair of bearing blocks, wherein the resulting bin assembly carriage travels horizontally along a support housing extending between front-to-back arrangements of rows of library systems, to enable expansion of the library systems into very large mass storage systems. The pair of bearing blocks of the bin assembly carriage are spread or closed to respectively raise or lower the bin assembly from or into a respective library system. Thus, vertical as well as horizontal motions of the bearing blocks are controlled by a motor/cable drum drive device secured to the support housing. In a preferred embodiment, a trapdoor mechanism and a cooperating roller support mechanism are used to enable reversing the direction of horizontal translation of the bin assembly carriage with a single motor/cable drum drive device. Various other embodiments and modifications are illustrated.

39 Claims, 17 Drawing Sheets

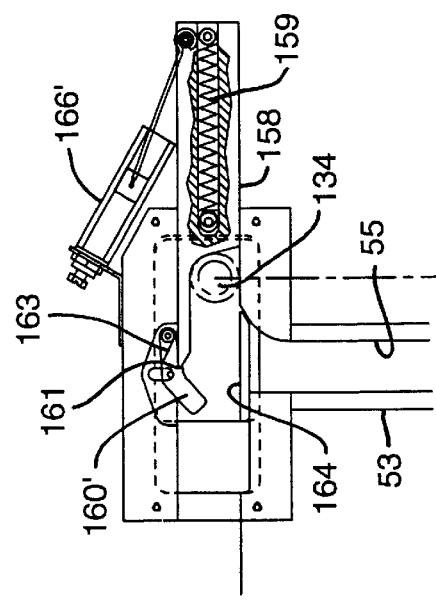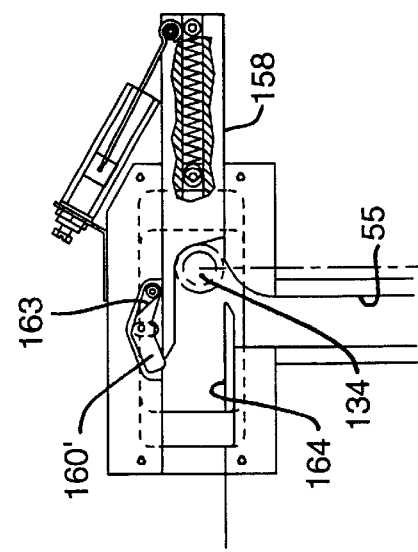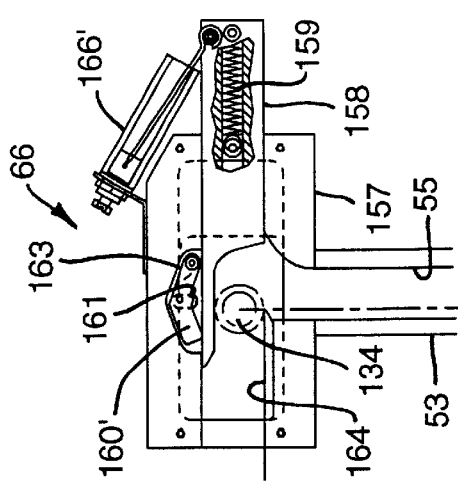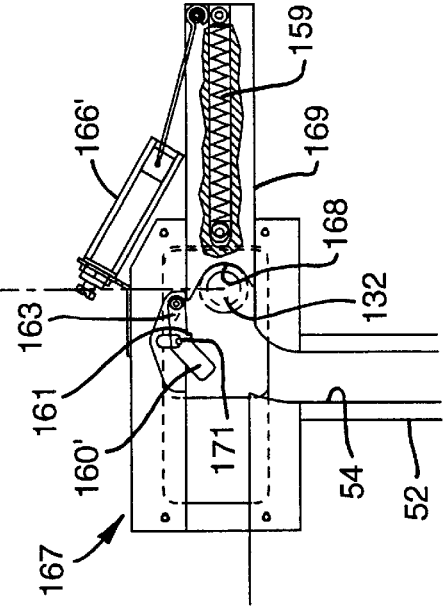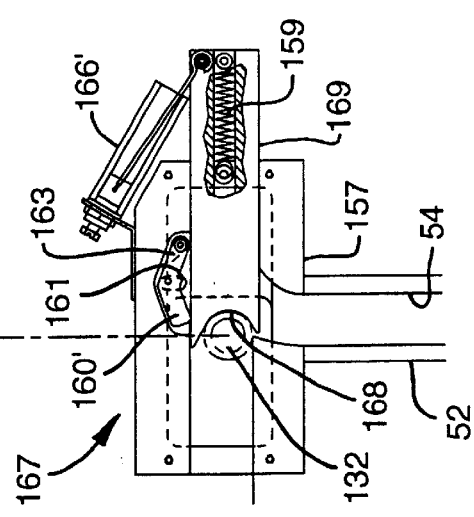

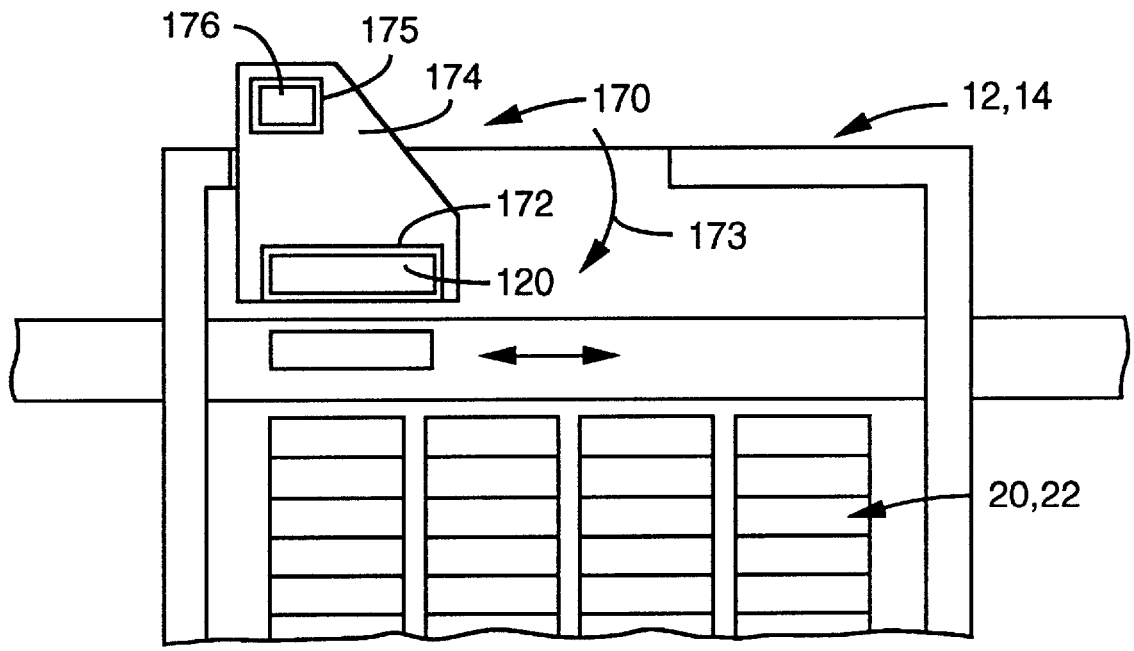
FIG. 15A (BIN DOWN)
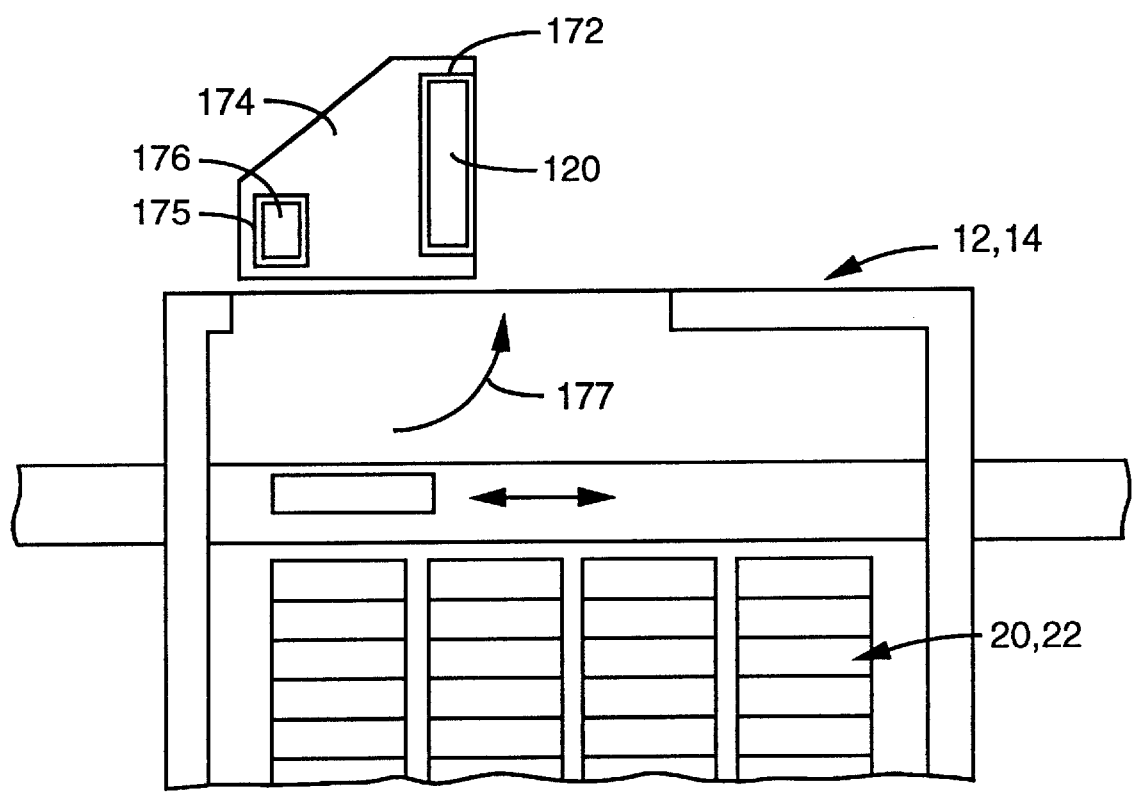
FIG. 15B (BIN UP)

INTER-ROW TRANSFER UNIT FOR MOVING TAPE CARTRIDGES BETWEEN ROWS OF LIBRARY SYSTEMS

CROSS REFERENCE TO RELATED APPLICATIONS

The present invention is related to U.S. patent application Ser. No. 09/293,007 filed Apr. 16, 1999, to Dennis M. Ryan, which is incorporated by reference herein.

BACKGROUND OF THE INVENTION

There are a variety of "mass storage" or "tape library" systems, consisting generally of one or more recording/reproducing tape drives, a number of tape cartridges stored in bins, and a robotics assembly for transferring cartridges to and from the tape drives and the cartridge bins.

Most of the typical mass storage or library systems are not "expandable", in that additional cartridges beyond their local storage capacity of cartridge bins must be inserted and removed manually. Those systems which offer expandability with some form of "pass-through" or conveyor system are generally slow, difficult to access for maintenance, or are suitable only for very large data-warehousing applications.

Accordingly, there has been a need for a simple self contained means of mechanically transferring cartridges between adjacent distinct library systems to increase overall mass storage system capacity, and one which can be easily installed and expanded in an installation at a customer's site. The above referenced patent application fulfills the need for a simple self contained inter-cabinet transfer unit which is relatively simple and easily installed between two or more cabinets of respective tape handling library systems. The inter-cabinet transfer unit employs a movable tape cartridge bin assembly which is moved between the cabinets whereby the movable bin assembly and cartridge is presented to a typical cartridge handling robot of respective library systems as if it were part of the typical stationary bin array housed within the associated cabinet.

To this end, the inter-cabinet transfer unit of the above mentioned application is configured to work in conjunction with, for example, from two to four library systems generally contained in 24-inch rack cabinets, such as the DST-712 library system manufactured by Ampex Corporation, Redwood City, Calif., or with for example, one, two or more DST-712 library systems and a DST-812 library system also manufactured by Ampex Corporation.

More particularly, the inter-cabinet transfer unit includes a base channel as a support means which extends between adjacent library systems in a two library system configuration, or through a third or fourth library system in a three or four library system configuration. A movable bin assembly is translatably supported by the base channel, is horizontally movable rapidly between the library systems and is stopped accurately and repeatedly at preset "depots", with one depot within each cabinet of the library systems for a respective transfer unit. A drive means, consisting of, for example, a motor driven cable drum and cable causes the rapid and accurate movement of the bin assembly between a depot in each respective library system. The depot locations (that is, the bin assembly) are addressed by each cartridge handling robot as if they were permanent addresses within the respective stationary bin arrays. Optical sensors associated with each depot verify the arrival of the respective bin assembly at each stop location. An optical sensor also determines whether a cartridge is present in the bin assembly at any of the depots. The inter-cabinet transfer unit provides for the retrieval and loading of a cartridge in a constant orientation relative to the movable bin assembly and the stationary bin array.

As may be seen from the disclosure in the above-mentioned application Ser. No. 09/293,007, the described inter-cabinet transfer unit is capable of transferring cartridges horizontally between adjacent cabinets. That is, it allows the expansion of for example the DST 712 and/or DST 812 library systems of previous mention into rows, utilizing the movable cartridge bin assembly which is horizontally translatable between stop locations (depots) in each library system.

The inter-cabinet transfer unit is preferred for relatively smaller mass storage systems, but is inadequate for larger mass storage systems formed of a larger number of tape library systems, since it requires all cabinets to be adjacent to each other in one straight line, that is, in side-by-side relation. This may not conform to the space limitations of the customer. Also, the inter-cabinet transfer unit must be "skewered" through the sides of the cabinets during installation, which thus becomes more difficult if a larger number of cabinets are to be linked together.

Accordingly it would be highly advantageous to be able to expand the number of library systems in a mass storage system in other than a straight line, that is, other than in a continuous row. For example, a more convenient and footprint efficient multiple cabinet configuration would consist of a multiple row arrangement wherein cabinets are positioned in two or more rows, that is, in a front-to-back relation, to define a square or rectangular foot print.

SUMMARY OF THE INVENTION

The present invention overcomes the single row arrangement limitations of the prior inter-cabinet transfer unit by allowing multiple rows of library systems to be assembled in a more preferred compact configuration. To this end, the present invention, referred to herein as an "inter-row" transfer unit, is designed to connect one of the DST 712 library systems, disclosed in the aforementioned application Ser. No. 09/293,007, to another DST 712 library system located directly behind it. Both cabinets are faced in the same direction with an access space (in this case, 3 feet) between them. A movable cartridge bin assembly, accessible to the cartridge handling robot of the first cabinet, is transported vertically up through the top of this cabinet, then horizontally until it is positioned over the second cabinet, and then vertically down until it is accessible by the cartridge handling robot of the second cabinet.

The advantage of this inter-row transfer unit is that it can link two parallel rows of DST 712 library systems, or DST 712 and DST 812 library systems. If a number of library systems are arranged in each row, then the cabinets within each row also are connected with the "inter-cabinet" transfer unit in the manner and configuration disclosed in the application Ser. No. 09/293,007. This combination of inter-row and inter-cabinet transfer units permits a "grid" or rectangular arrangement of the library system cabinets, which is more suitable for most installation spaces, and minimizes the distance a cartridge must travel between extreme bin locations.

The inter-row transfer unit of the present invention, and thus the movable bin assembly thereof, is situated immediately above the inter-cabinet transfer unit and thus does not interfere with its function. Therefore, the inter-row transfer unit of the present invention can be installed over any pair of DST 712's in a front-to-back grid. Also, the respective ends of two of these inter-row transfer units can be installed in a respective DST 712 located in a middle row of library systems, with the respective end of one unit extending to a second row in front, and an end of another unit extending to a third row behind. Thus, a mass storage system arrangement of three or more rows of library systems is possible.

Having the inter-row transfer unit located above the cabinets yields several other advantages. For example, adequate headroom (6'5" or 1.96 m) is provided over the corridor between rows of cabinets, front and rear access to the cabinets is not compromised and installation of the inter-row transfer units is simplified.

Furthermore, since all cabinets are faced in the same direction, there is no necessity to turn or rotate the cartridge during the loading and retrieving processes, as is the case in most existing large library systems. The fact that the cartridge is handled with a constant orientation during loading and retrieving allows the use of a simpler and more reliable cartridge handling robot as well as bin assembly.

With regards to the mechanism of the inter-row transfer unit of the invention, the movable bin assembly is slidably supported on a shaft secured within a housing which extends between two front-to-back cabinets, generally of respective rows of cabinets of corresponding library systems. A cable drum/cable drive means mounted within the housing provide for the movement of the bin assembly, which is suspended from two bearing blocks by means of two pairs of support links. The combination bin assembly, support links and bearing blocks comprise a vertically/horizontally moveable "bin assembly carriage" which, in a preferred embodiment, is capable of being vertically as well as horizontally translated via a single drive means. Vertical translation of the bin assembly and cartridge is provided by opposing motion outward of the bearing blocks to raise the bin assembly, and opposing motion inward to lower the assembly, as is fully described below. The same cable drum/cable drive means provides the vertical movement of the bin assembly into and out of each library system as well as the horizontal translation between rows of library systems of the bin assembly carriage, formed of the bin assembly, supporting links and bearing blocks as a unit.

In a preferred embodiment of the invention, the drive means employ a single motor and cable drum, a single cable and a "trapdoor" mechanism which enables the vertical motion, as well as the reversal of the horizontal translation of the bin assembly carriage, using the single cable and motor/cable drum drive means.

An alternative embodiment of the invention employs a pair of cables and respective pair of motors/cable drums as the drive means mounted within the housing, whereupon the "trapdoor" mechanism is not required.

In another alternative embodiment, the pair of bearing blocks, the counter rotating links and the suspended bin assembly are replaced with a cartridge bin assembly carriage formed of a bin assembly affixed to a solid plate which in turn is slidably supported via a linear bearing block on a square or splined shaft mounted within the housing. The bin assembly and cartridge are lifted from, and lowered into, a cabinet by rotating the shaft 90 degrees with a second motor or the like. A cable drum/cable drive means provide for translation of the bin assembly between library systems.

BRIEF DESCRIPTION OF THE DRAWINGS

FIG. 1A is a pictorial view illustrating a north-south and east-west layout of two rows of multiple library systems relative to the inter-row transfer unit of the present invention.

FIGS. 3A and 4A are enlarged views of a portion "A" of the bin assembly depicting embodiments of a bin assembly flag, a cartridge flag and an alignment pin and coacting bushing. FIG. 3 also depicts sensor means, in phantom line, for coacting with respective flags attached to the bin assembly.

FIGS. 12A–12F are side views of the trapdoor mechanism and a roller support mechanism, illustrating their simultaneous functions.

FIGS. 15A and 15B are partial pictorial views of another alternative embodiment of the invention with a respective bin assembly carriage in the down and up positions, respectively.

DETAILED DESCRIPTION OF THE EMBODIMENTS

Figure 1:
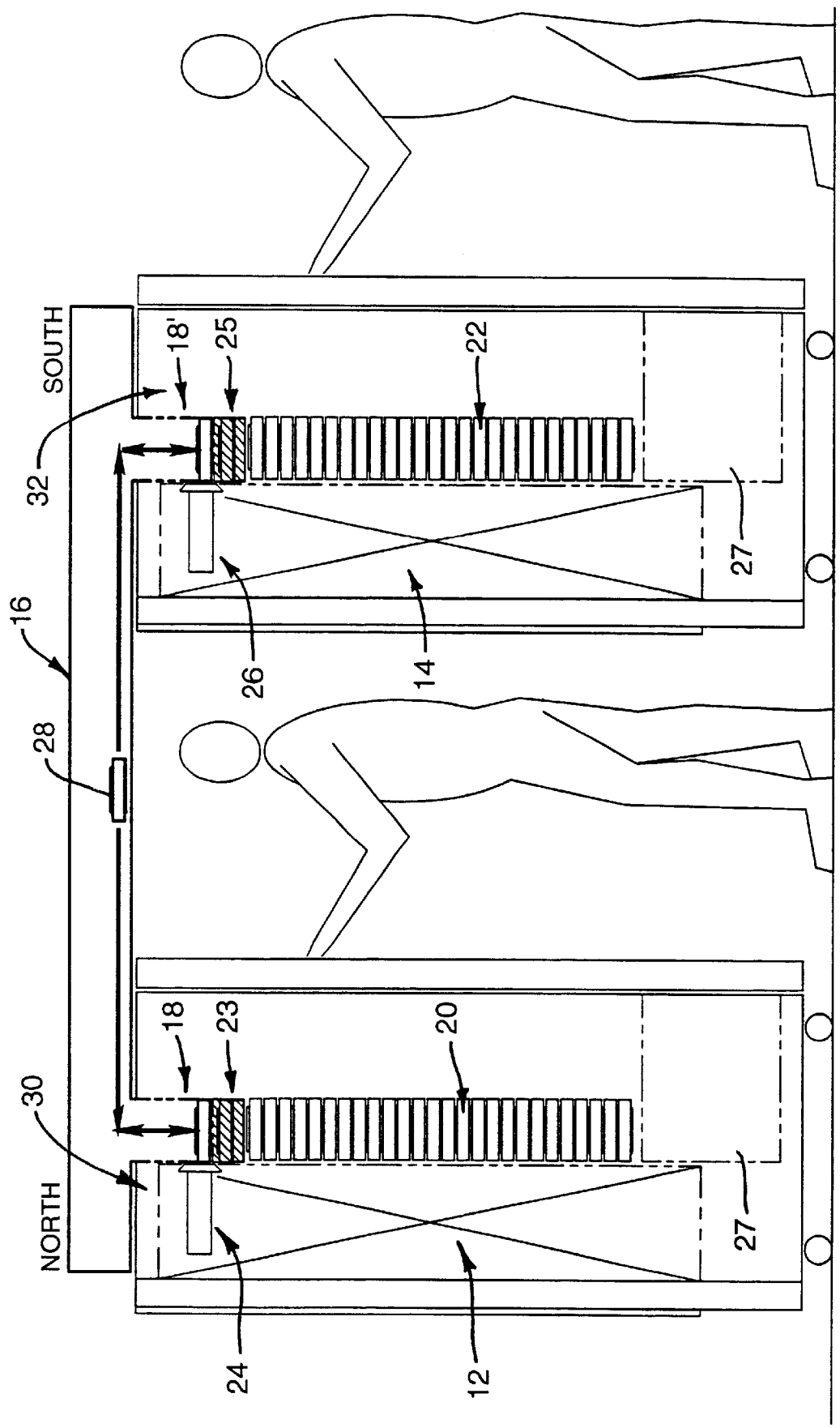
FIG. 1 is a simplified sectional view illustrating the installation of an inter-row transfer unit of the invention between two rows of library systems.

An installation of the present invention is illustrated in FIG. 1 which depicts a simplified side cross-section of, for example, the cabinets of two DST 712 library systems 12 and 14, such as previously mentioned. Each of the library systems may be one in a row of such DST library systems and/or may include a larger DST 812 library system, also of previous mention. An inter-row transfer unit 16 of the present invention is installed above the cabinets of the library systems 12, 14 such that a movable bin assembly carriage (pictorially indicated by numeral 18, 18') will be aligned with conventional stationary bin arrays 20, 22 of the library systems 12, 14, respectively, when the carriage is lowered to the down position. Accordingly, the bin assembly carriage and thus a cartridge in the integral bin assembly (all further described below) is accessible to a conventional cartridge handling robot 24, 26 of the respective library systems as though it was a bin at the top of the stationary bin arrays 20, 22. FIG. 1 also depicts the position of respective inter-cabinet transfer units 23, 25 of the aforementioned application, between the down position of the bin assembly carriage and the top bins of the stationary bin arrays, and also accessible to the robots 24 and 26. One, or more, tape recorder/reproducer devices, herein referred to as a "tape-drive" unit 27, is located at the bottom of the cabinets and also is accessible to the respective robot 24 or 26.

The bold arrows within the inter-row transfer unit 16 indicate the path of the movable bin assembly carriage carrying a cartridge (depicted at 28) from one library system in one row to another library system in another row. As can be seen, vertical motion to and from each cabinet is necessary in order to transfer the bin assembly and carriage over the cartridge handling robots 24, 26 and the top of the cabinets.

Figure 2:
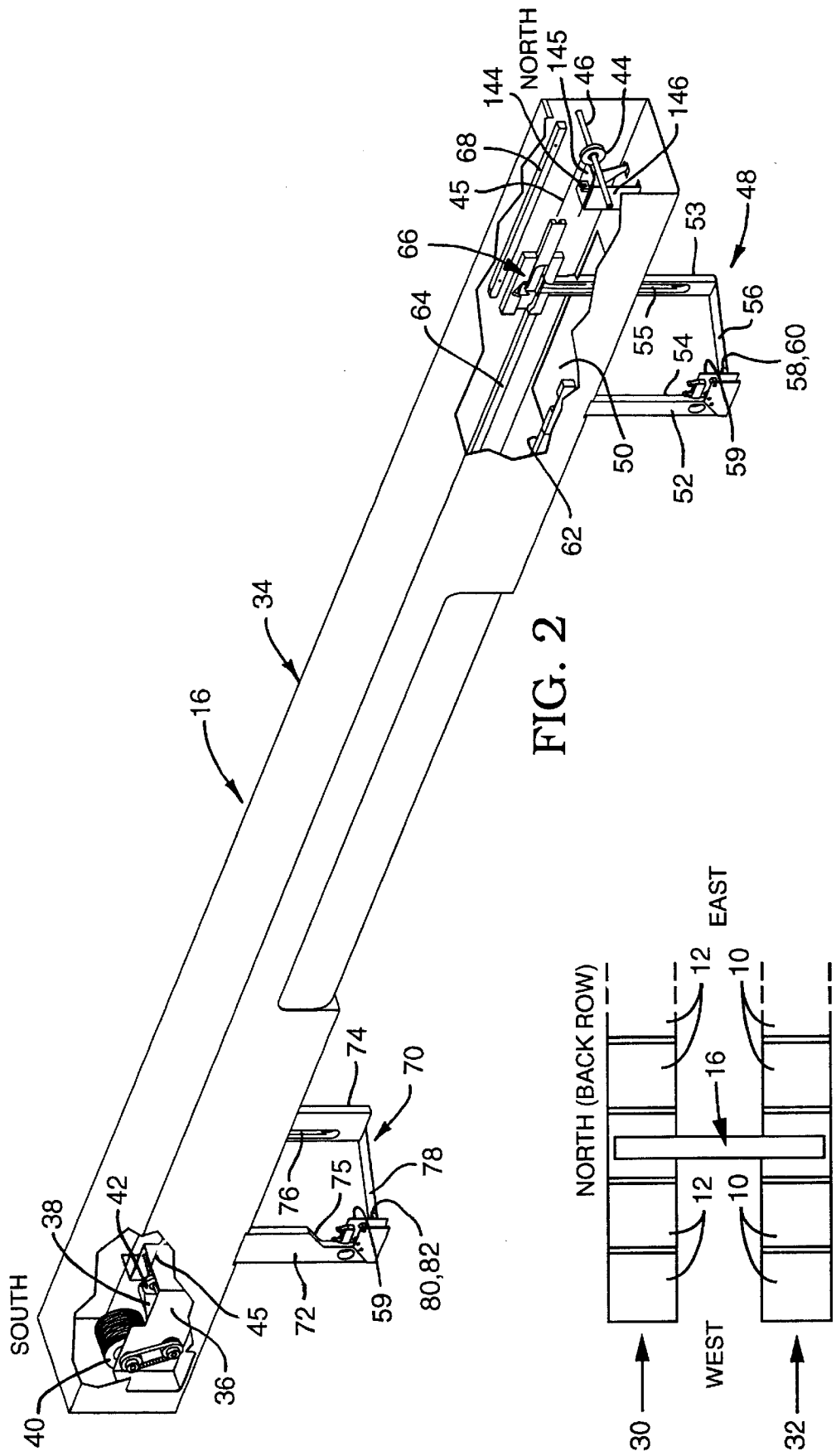
FIG. 2 is a simplified perspective view with breakouts illustrating the horizontal and vertical support for the movable bin assembly carriage, the drive means and the trapdoor mechanism, as installed within a supporting housing extending between two rows of library systems.

The inter-row transfer unit 16 includes a support housing, further described in FIG. 2, which is supported upon the upper framework of both cabinets of the library systems 12, 14. The standard top covers (not shown) of the cabinets are replaced with perforated filler panels (not shown) on either side of the transfer unit 16.

As a means for facilitating the description and the functions of the present invention, the terms "north" and "south" are herein employed to distinguish a rear row 30 of the library systems from the front row 32. See FIG. 1A as well as FIG. 1. Likewise, the library systems in each row to the left of the page are "west" while those to the right of the page are "east". It follows, for example, that the inter-cabinet transfer unit of the application Ser. No. 09/293,007 of previous mention may be called an "east-west" transfer unit, while the inter-row transfer unit of the present application may be called a "north-south" transfer unit. Therefore, when the bin assembly carriage of the present invention is translated from the front row to the back row it is being moved in a north direction, and vice versa.

One of the main design objectives, and a decided advantageous feature of the inter-row (or north-south) transfer unit of the present invention, is to be able to achieve both the vertical and horizontal motions of the bin assembly carriage and cartridge without having to transport a vertical motion power source and all the necessary electrical power and control connections over the relatively long horizontal travel distance between rows of cabinets. The embodiments of the present invention provide several alternatives for achieving such a goal.

To this end, FIG. 2 illustrates a support housing 34 for supporting the movable bin assembly carriage of previous mention, and a means for translating the carriage in both a vertical and horizontal direction as described below in FIGS. 3–15. The housing 34 of the inter-row transfer unit is a formed and welded steel sheet metal structure with a hollow, generally rectangular cross-section. A bracket 36 is secured at one end (i.e. the south end in this example) of the housing 34 for mounting a gearmotor 38 and a cable drum 40 to the housing. A guide pulley 42 also is rotatably mounted to bracket 36. A turnaround pulley 44 is rotatably mounted via a shaft 46 within the opposite end (i.e. the north end in this example) of the housing 34. A nylon-coated steel cable 45 extends from the cable drum 40 to the wraparound pulley 44 and is attached to the bin assembly carriage as further described in FIGS. 3–10 and 13, 14.

A carriage vertical guide assembly 48 formed of a pair of generally opposing vertical members 52, 53 is rigidly suspended through an opening 50 in the north end of the housing. The vertical members 52, 53 are not directly opposed but are staggered in the direction of horizontal bin assembly carriage movement an amount equal to roughly the width of the bin assembly carriage as further shown below. A pair of generally opposing vertical guide channels 54, 55 are formed in the pair of vertical members, 52, 53, respectively and act as guides for the bin assembly carriage during its vertical translation, as further described below. The vertical members 52, 53 are strengthened by means of a cross-strap 56 suitably secured to the bottom ends thereof. A pair of sensors 58, 60, such as an optical LED sensor, are mounted via a printed wiring assembly (PWA) board 59 at specific positions on the vertical member 52 as shown more distinctly in FIG. 3A, and are used to detect the presence of the bin assembly and the cartridge, respectively, at a stop location (depot) in the respective library system, as described below.

A pair of opposing narrow guide rails 62, 64 are secured within the opposite walls of the housing 34 along the length thereof and provide guiding support for the bin assembly carriage during the horizontal translation thereof between the rows of library systems 10, 12. The north end of the housing also includes a trapdoor mechanism 66 integral with the upper end of the vertical member 53 and respective vertical guide channel 55, which allows reversing the direction of travel of the carriage while using a single motor and cable drive means. The details and function of the trapdoor mechanism 66, in an embodiment where it is used alone, are more fully described in relation to FIGS. 11A, 11B and FIGS. 7–10, respectively. An alternative embodiment where the trapdoor mechanism 66 operates in combination with a roller support mechanism is fully described below with respect to FIGS. 12A–12F. A relatively short pair of guide rails 68 also are secured to the respective walls of the housing 34 in the region of the carriage vertical guide assembly 48 and the trapdoor mechanism 66 upon which a roller 102 (FIGS. 3–11) runs, to prevent rocking of the carriage during vertical translation thereof when the horizontal guide rails 62, 64 are not supplying support for the carriage.

A second carriage vertical guide assembly 70 similar to assembly 48 is suspended in like fashion via an opening (not shown) in the south end of the housing 34. The assembly 70 includes generally opposing (but staggered) vertical members 72, 74 having respective vertical guide channels 75, 76 formed therein in generally opposing configuration. The ends of the members 72, 74 are stiffened with a cross-strap 78 secured thereto. A pair of sensors 80, 82 similar to sensors 58, 60 are mounted at a specific position on the vertical member 72 (see also FIG. 3A), and are used to detect the presence of the bin assembly carriage and a cartridge in the bin assembly, respectively, when the bin assembly carriage is in the down position at the south end of the inter-row transfer unit 16.

Figure 3:
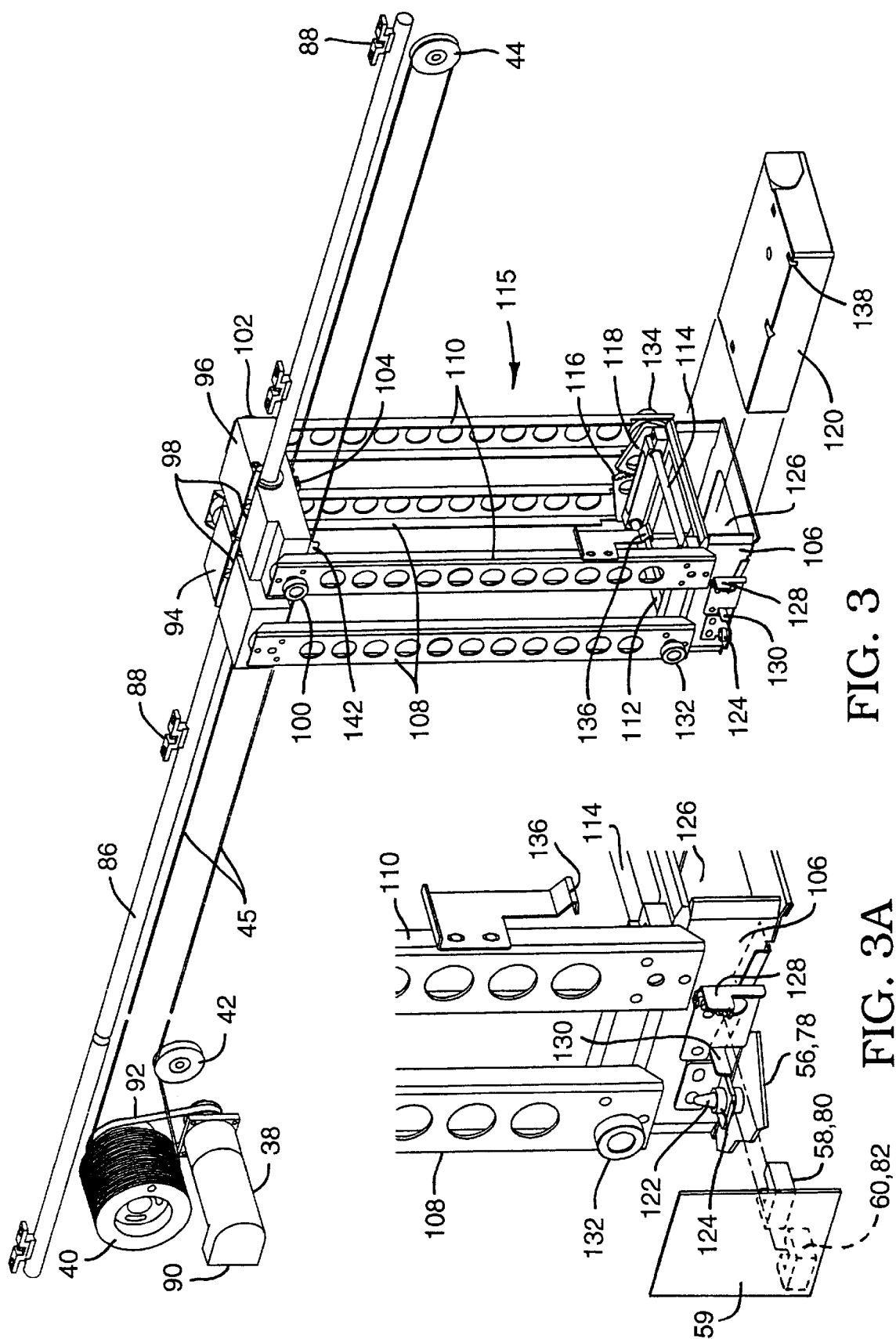
FIG. 3 is a perspective view illustrating an embodiment of the invention, removed from the housing for facilitating the description, depicting the bin assembly carriage in the down position with the tape cartridge removed from the bin assembly.

FIG. 3 illustrates the operating mechanism of an inter-row transfer unit with the housing 34 of FIG. 2 omitted to facilitate the description, while improving the visual clarity of the mechanism. The bin assembly carriage of previous mention, and hereinafter numbered 115, is supported on an elongated shaft 86 which is rigidly suspended from the top of the housing 34 on, for example, seven equally spaced hanger blocks 88. Located generally below the south end of the shaft 86 is the gearmotor 38, cable drum 40 and guide pulley 42 of mention in FIG. 2. As may be seen, similar numbers are used to identify like components throughout the FIGS. 2–14. The gearmotor 38 is equipped with a tachometer 90 whose function is further described below in the description of the control of the translation process. The cable 45 is driven by the tachometer equipped gearmotor 38 via the cable drum 40, wherein the drum 40 is supported on bearings mounted in the bracket 36 (FIG. 2) which is secured within the housing 34. The cable drum is driven by a timing belt 92 extending to the gearmotor 38.

The shaft 86 supports two bearing blocks 94 and 96, which are free to slide along the shaft on open-type linear ball bushings 98. Horizontal guide rollers 100, 102 on both sides of the block 96 roll on the narrow guide rails 68 (FIG. 2) at each end of the housing 34 to prevent the blocks (and thus the bin assembly carriage 115) from rotating about the shaft during vertical motion of the bin assembly carriage within the housing. Only the (right) block 96 is attached to the cable 45 in this embodiment, and thus block 96 is driven back-and-forth by the nylon-coated steel cable 45 depending on the direction of cable motion. Both ends of the cable 45 are attached to the block 96 via a bracket 104 on the underside of the block (for example, see bracket 104' in FIG. 14 and the application Ser. No. 09/293,007).

The cable 45 is wrapped 10 turns around the cable drum 40, entering at the top and exiting at the bottom. The cable then passes over the guide pulley 42, underneath the bearing blocks 94, 96, around the turnaround pulley 44 on the far (north) end of the housing 34, and is terminated at the attachment bracket 104. Cable tension is provided by a spring (not shown) between the two cable attachment points, in a manner identical to that shown in the application Ser. No. 09/293,007. Also, the cable is anchored to the drum 40 at a position which never winds off the drum to insure that the bearing block 96 position is repeatable. This arrangement is shown foreshortened in FIGS. 3–10, as indicated by the breaks in the shaft 86 and cable 45.

A cartridge bin assembly 106, previously mentioned briefly but not numbered, is suspended beneath the two bearing blocks 94, 96 on two pairs of links 108, 110 which attach to the bin assembly 106 via pivot shafts 112, 114 at each end. Accordingly, the bin assembly 106, the links 108, 110 and the bearing blocks 94, 96 comprise the movable bin assembly carriage (namely carriage 115) referred to previously. A pair of meshed sector gears 116, 118 on the two lower pivot shafts 112, 114 insure that the links counter-rotate equally, preventing the linkage from "rocking". When the links 108, 110 are hanging vertically, as shown, the bin assembly 106 is in the lowered position, and a cartridge 120, previously mentioned and numbered 28 in FIG. 1, can be inserted or removed as depicted. In this position, an alignment pin 122 secured to the cross-strap 56 or 78 (also FIG. 2) mates with an alignment bushing 124 secured to the side of the bin assembly 106 (see also FIG. 3A), to insure that the bin 126 of the bin assembly is presented to a respective cartridge handling robot 24, 26 (FIG. 1) in a repeatable fashion. A bin flag 128 secured to the side of the bin assembly 106 (see FIG. 3A) interrupts the beam of either the optical sensor 58 or 80 of the vertical members 52 or 72 respectively, to signal that the bin assembly 106 is present in that particular cabinet. When the cartridge 120 is inserted into the bin assembly, it causes a pivotably mounted cartridge flag 130 to rotate downward, to interrupt the beam of either of the respective optical sensors 60 or 82, signaling that a cartridge 120 is present.

Figure 4:
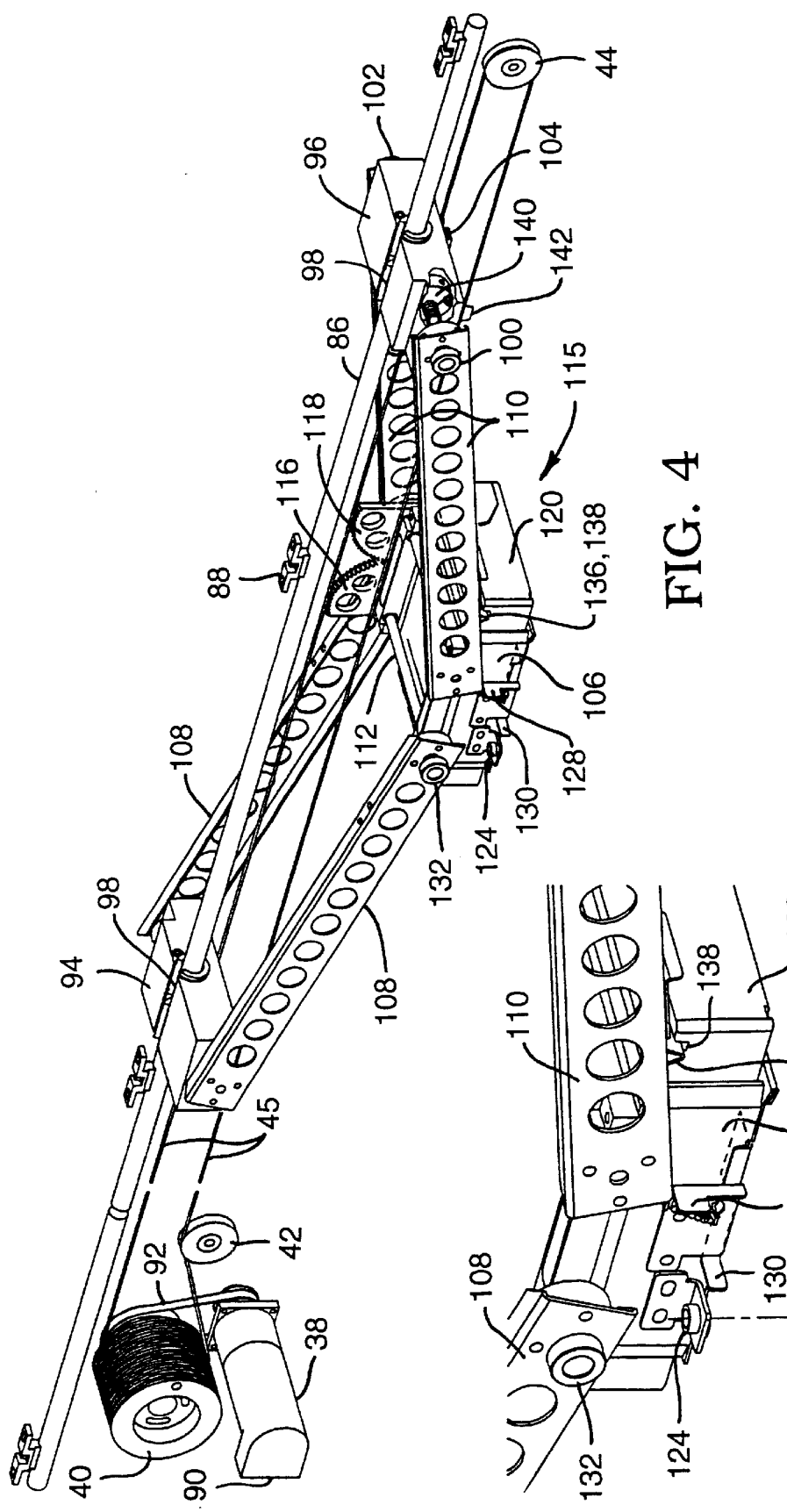
FIG. 4 is a perspective view similar to that of FIG. 3 but with the bin assembly carriage in the up position with the cartridge loaded in the bin assembly.

In accordance with the invention, vertical motion of the bin assembly carriage 115 and thus the bin assembly 106, is caused by moving the bearing block 96 to the right (i.e, north) until the linkage, comprising the links 108, 110, is in the position shown in FIGS. 4 and 4A, corresponding to 9 ½ inches of lift. A vertical guide roller 132, is rotatably mounted on the end of the pivot shaft 112, while a vertical guide roller 134 is mounted on the opposite end of the pivot shaft 114 (FIGS. 3, 5 et seq.), on respective sides of the bin assembly 106. The guide rollers 132, 134 run in respective vertical guide channels 54, 75 or 55, 76 formed in the vertical members 52, 72 and 53, 74, respectively, suspended integral with the housing 34, to prevent horizontal motion of the bin assembly carriage 115 and force the blocks 94, 96 apart to provide the vertical movement of the bin assembly 106. Once these rollers have exited from the top of the vertical guide channels, they roll horizontally along guide rails 62, 64 thus supporting the carriage as it moves horizontally between the two cabinets.

Referring to FIG. 4, as the bin assembly 106 is lifted, a leaf-spring cartridge retainer 136 secured to one of the links 110 (FIGS. 3A, 4A) rotates down with the link to engage a slot 138 formed in the top surface of the cartridge 120 to capture the cartridge. Four torsion springs 140 (FIG. 4) within the bearing blocks 94, 96 exert an upward force on the bin assembly carriage 115 to minimize the force the cable must exert to separate the blocks. A block position flag 142 (FIGS. 3, 4) mounted beneath one side of the bearing block 96 interrupts the beam of an optical vane sensor 144 mounted on a vane sensor PWA board 145 (FIGS. 2 and 16) during each operating cycle to calibrate the gearmotor tachometer 90, so that thereafter every stop position of the carriage 115 is precisely known, as described below. The vane sensor 144 is mounted via the vane sensor PWA board 145 on a bracket 146 in a fixed location preferably near the north end of the housing 34 as shown in FIG. 2.

Thus, it may be seen that the bearing blocks 94, 96, the links 108, 110 and the bin assembly 106 form the movable bin assembly carriage 115 capable of transferring the cartridge 120 vertically into and out of respective cabinets as well as horizontally between library systems 12, 14 in rows 30, 32 of library systems in north-south and south-north directions, employing a single gearmotor/cable drum and cable. How this is accomplished is fully described with respect to FIGS. 5–11.

The sequence of motion of this embodiment of the inter-row transfer unit of the present invention is illustrated in FIGS. 5–11. The vertical guide members 53 and 74, which are part of the housing 34, and the horizontal and vertical guide rollers 102, 134, respectively, are shown exploded for clarity of description. In FIGS. 5–10, the similar vertical guide members 52, 72 on the foreground side of the figures are not shown for clarity, although it is readily apparent that the vertical guide roller 132 in the foreground also is guided by the vertical guide channels 54, 75 of previous description.

To facilitate the description of the sequence of motion of the movable bin assembly carriage 115 and the unique process for allowing both directions of translation with a single motor and a cable attached only to one bearing block, it is expedient to refer to the directions of movement as "north" and "south". In keeping with the orientation of the inter-row transfer unit of previous description depicted in FIGS. 1 and 2, the "south" end containing the motor/drum/cable "drive means" is located at the front row 32 (FIGS. 1, 1A), while the "north" end containing the trapdoor mechanism 66 extends to the back row 30.

As previously mentioned, similar components in the FIGS. 2–11 are similarly numbered, while components which are slightly different and perhaps located differently than previously shown but which perform the same function, are identified with the same integer number but also include a prime symbol.

Figure 5:
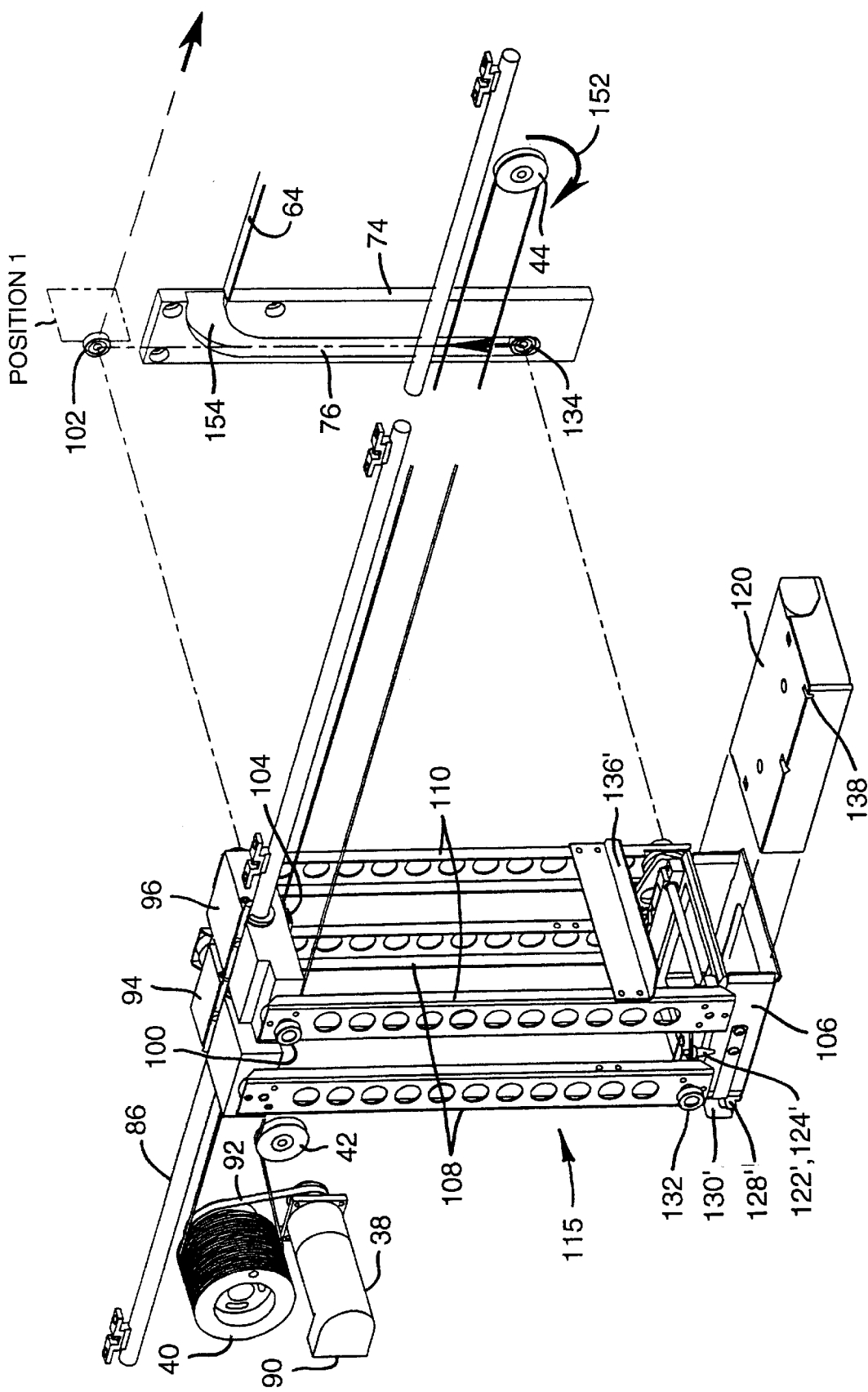
FIG. 5 is a perspective view similar to those of FIGS. 3, 4 with the bin assembly carriage lowered at a "position 1" of the "south" cabinet of the "south" row of library systems, showing cartridge loading.

FIG. 5 depicts the beginning of a south-north/north-south movement cycle wherein the bin assembly 106 is lowered or down on the south end of the transfer unit, (corresponding to a front DST 712 cabinet 14). In this description of a cycle of the inter-row transfer unit it is assumed that the tachometer 90 is calibrated, which process is described below relative to the block diagram of FIG. 15. The bearing block 96 (i.e. horizontal guide roller 102) is servoed to a "position 1" by the tachometer 90, where the bin assembly 106 is in register with the stationary bin array 22 of the respective cabinet 14 immediately above the respective inter-cabinet transfer unit 25, and thus is positioned to receive or unload the cartridge 120 via action by the respective cartridge handling robot 26 (FIG. 1). Assuming that the cartridge 120 is loaded in the bin assembly 106, to initiate motion the cable drum 40 rotates in a clockwise direction (CW) as shown by arrow 152 at turnaround pulley 44, moving the bearing block 96 to the north. The resulting spreading of the links 108, 110 is caused by the vertical guide rollers 132, 134 being confined in vertical guide channels 75, 76, which spreading causes the rollers 132, 134 to move vertically up in the respective channels 75 (FIG. 2) and 76, raising the bin assembly to the up or raised position shown in FIG. 6. Note that the vertical guide channel 76 (and 75) is curved at 154 towards the north direction with the respective lower edge thereof precisely in register with the top surface of the horizontal guide rail 64 (and 62) upon which the vertical guide roller 134 (and 132) are supported for horizontal translation of the movable bin assembly carriage 115 along the housing 34.

FIGS. 5–10, 13, 14 illustrate alternative embodiments of the bin assembly and cartridge flags, viz, 128' and 130', and of the alignment pin and bushing, viz, 122' and 124' (which also are reversed in position), as well as of the cartridge retainer, viz, 136', each of which however provide the same functions as the equivalent components of FIGS. 3, 4.

Figure 6:
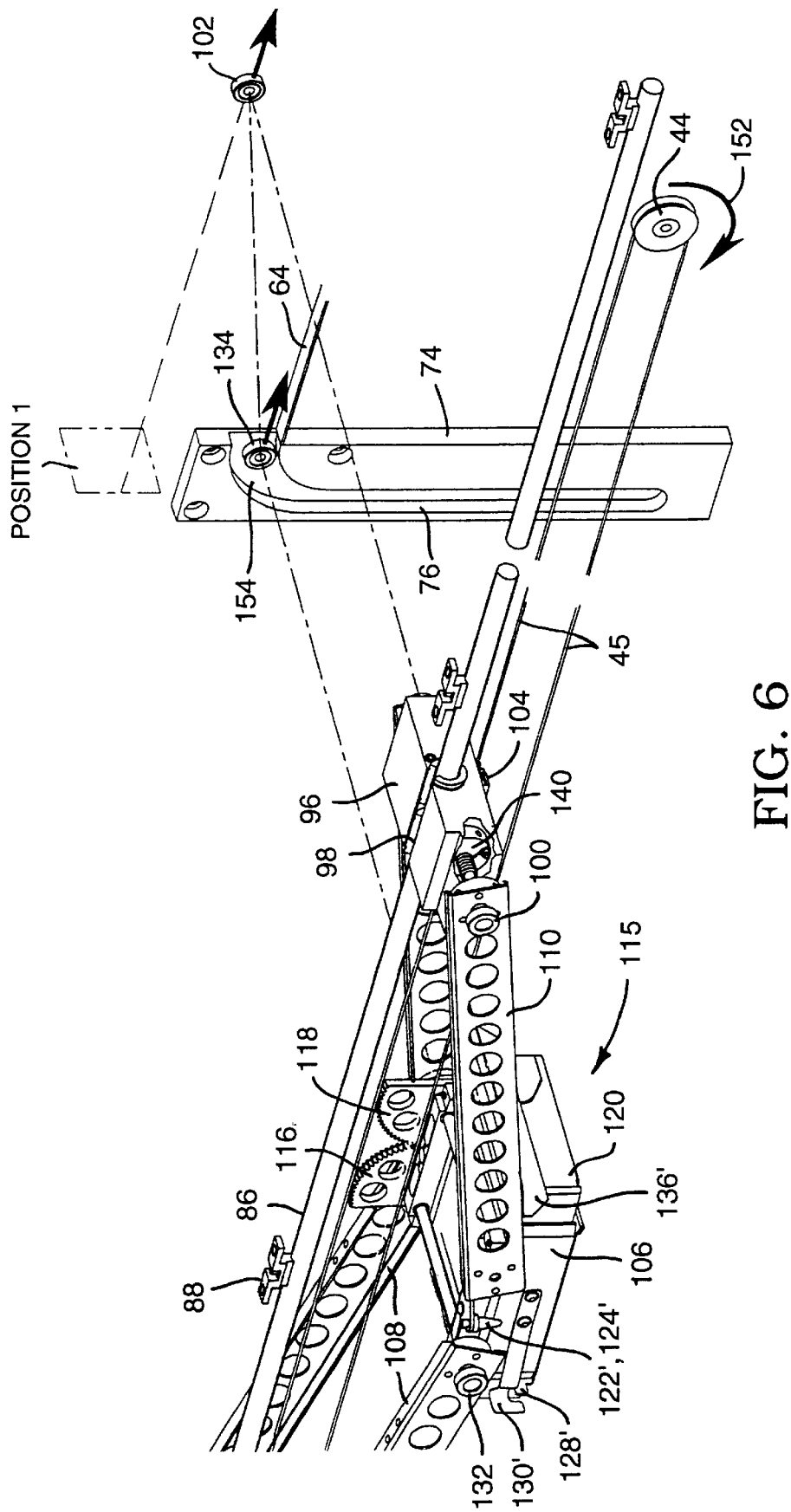
FIG. 6 is a perspective view similar to that of FIG. 5 with the bin assembly carriage raised in the position 1, with a cartridge loaded in preparation for translation from the south cabinet.

FIG. 6 depicts the bin assembly 106 raised on the south end of the inter-row transfer unit so that the vertical guide rollers 132, 134 are on the horizontal guide rails 62, 64. Further CW rotation of the cable drum 40 (arrow 152) now initiates horizontal motion and causes the vertical rollers 132, 134 to move horizontally along the horizontal rails 62, 64 provided in the housing 34 until the bin assembly carriage 115 is over the rear DST 712 library system 12 of the north row 30 of library systems.

Figure 7:
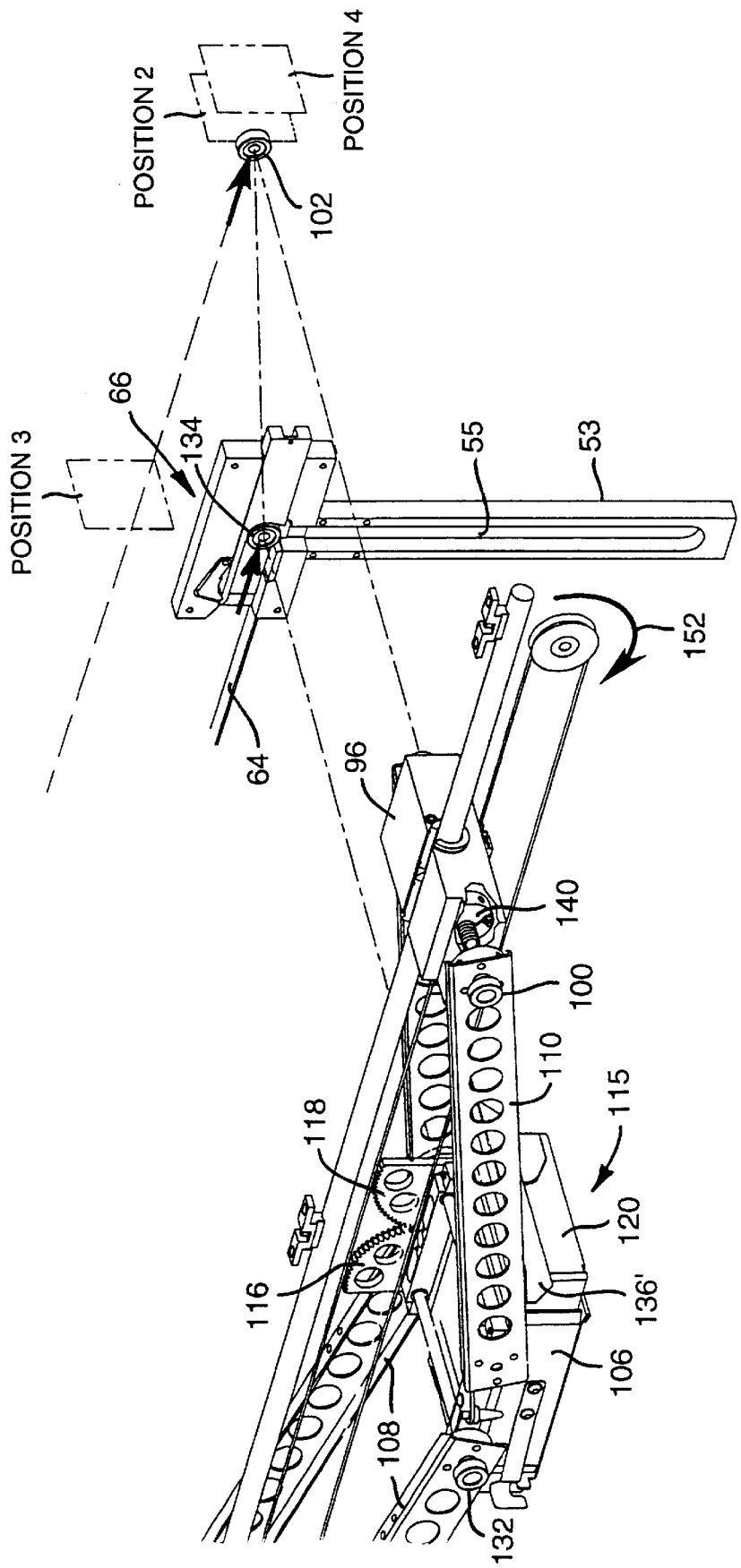
FIG. 7 is a perspective view similar to the previous figures with the bin assembly carriage raised and after translation to a "position 2" in a "north" cabinet of a "north" row of library systems.

In FIG. 7, continued CW rotation translates the carriage 115 until the bearing block 96 is servoed by the tachometer 90 to a "position 2" at the north end of the transfer unit. At this point, the vertical guide rollers 132, 134 are directly over the respective vertical guide channels 54, 55 which extend down into the library system 12 immediately above the inter-cabinet transfer unit 23 in register with a respective stationary bin array 20 (FIG. 1), so as to be accessible to the cartridge handling robot 24.

Figure 8:
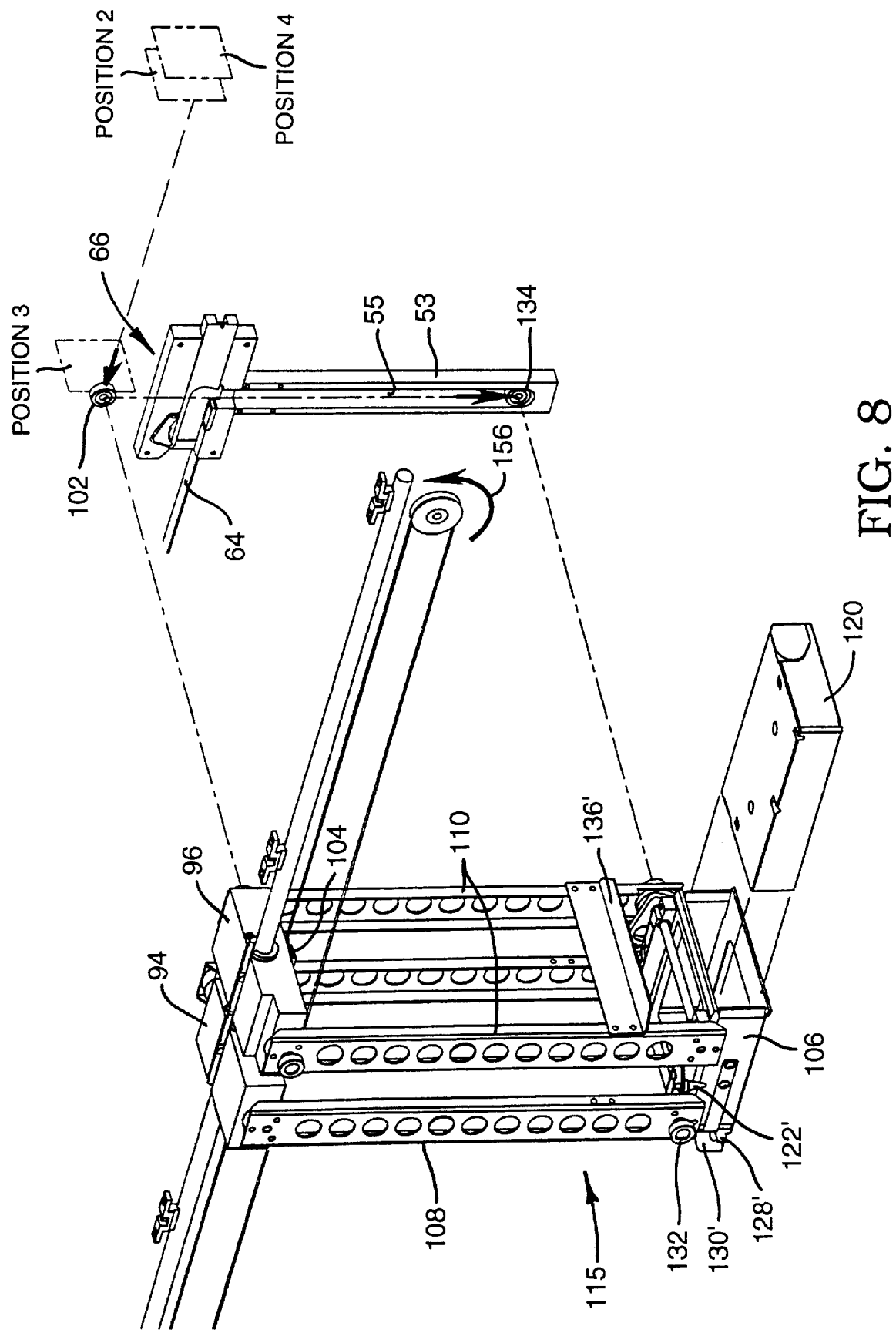
FIG. 8 is a perspective view similar to that of FIG. 7 with the bin assembly carriage lowered at a "position 3" in the north cabinet, showing cartridge removal.

FIG. 8 depicts a reversal in the rotation of the cable drum 40, whereby the cable motion is reversed as shown by counter-clockwise (CCW) arrow 156, to return and hold the bearing block 96 at a "position 3" determined by the tachometer 40. Gravity causes the carriage 115 and vertical guide rollers 132, 134 to descend the vertical guide channels 54, 55, bringing the two bearing blocks 94, 96 together and positioning the bin assembly 106 via the alignment pin 122'/bushing 124' (also FIG. 13) for access by the respective cartridge handling robot (robot 24).

Figure 9:
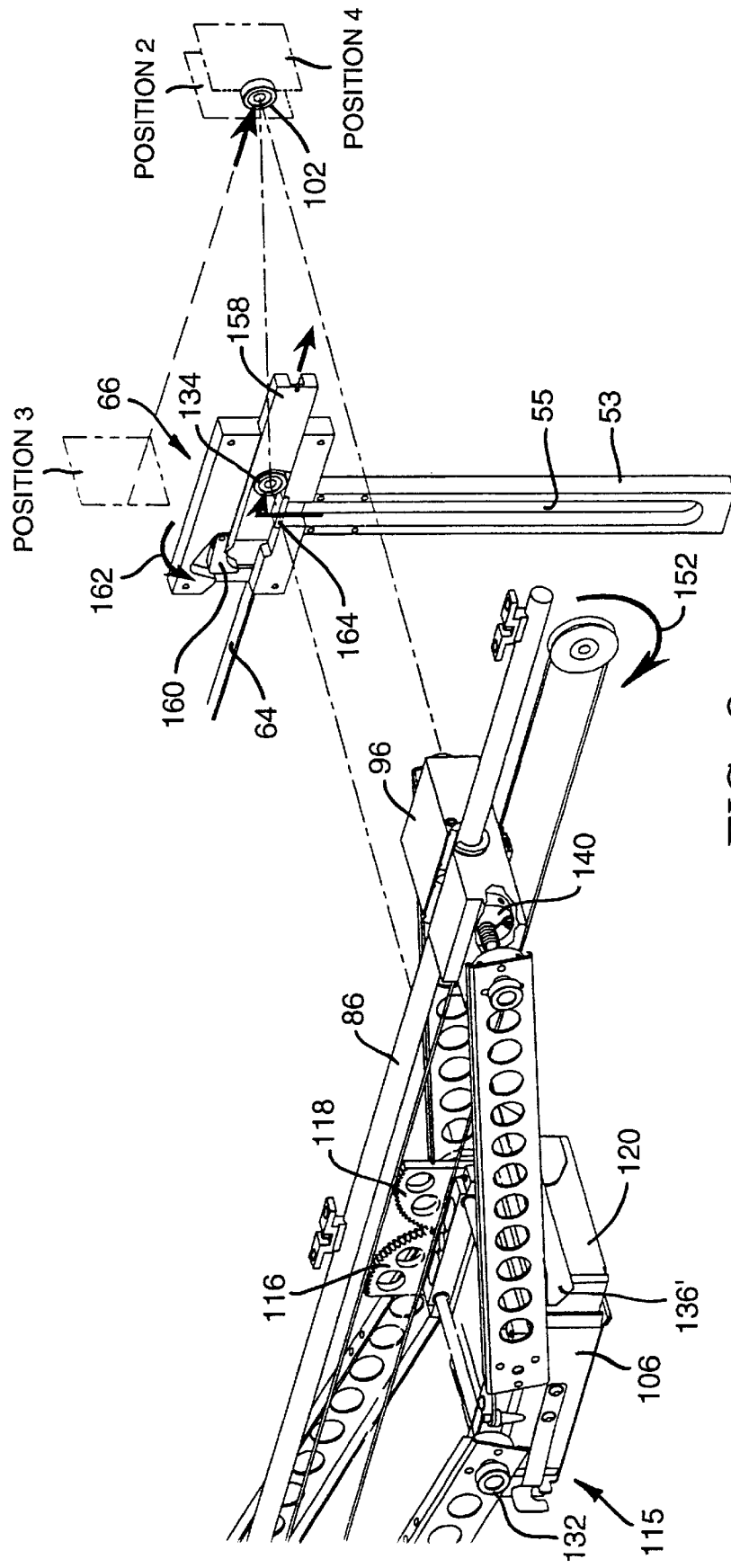
FIG. 9 is a perspective view similar to those of FIGS. 7, 8 with the bin assembly carriage and a cartridge raised at a "position 4" in the north cabinet, further showing the actuation of the trapdoor mechanism.

FIG. 9 depicts the process for initiating a reversal in the direction of translation of the bin assembly carriage 115. To this end, the cable drum 40 is rotated CW again whereby the cable 45 is moved (arrow 152) to position the bearing block 96 at a "position 4", approximately one inch to the right (north) of position 2 as determined by the tachometer 90. Thus the vertical guide rollers 132, 134 are lifted clear of the respective vertical channels 54, 55 and approximately one inch further north than in FIG. 7. In doing so, as more clearly illustrated by also referring to FIGS. 11A and 11B, the roller 134 drives a sliding member 158 mounted within a base 157 of the trapdoor mechanism 66 to the right, against a light spring load supplied by a spring 159, until the opposite end of the member 158 is latched by a notch 161 in a spring loaded pawl 160 (arrow 162, FIG. 11B). The pawl 160 is urged downward by a torsion spring 163. The sliding member 158 also contains a "trapdoor" 164 which covers the opening of the vertical guide channel 55.

Figure 10:
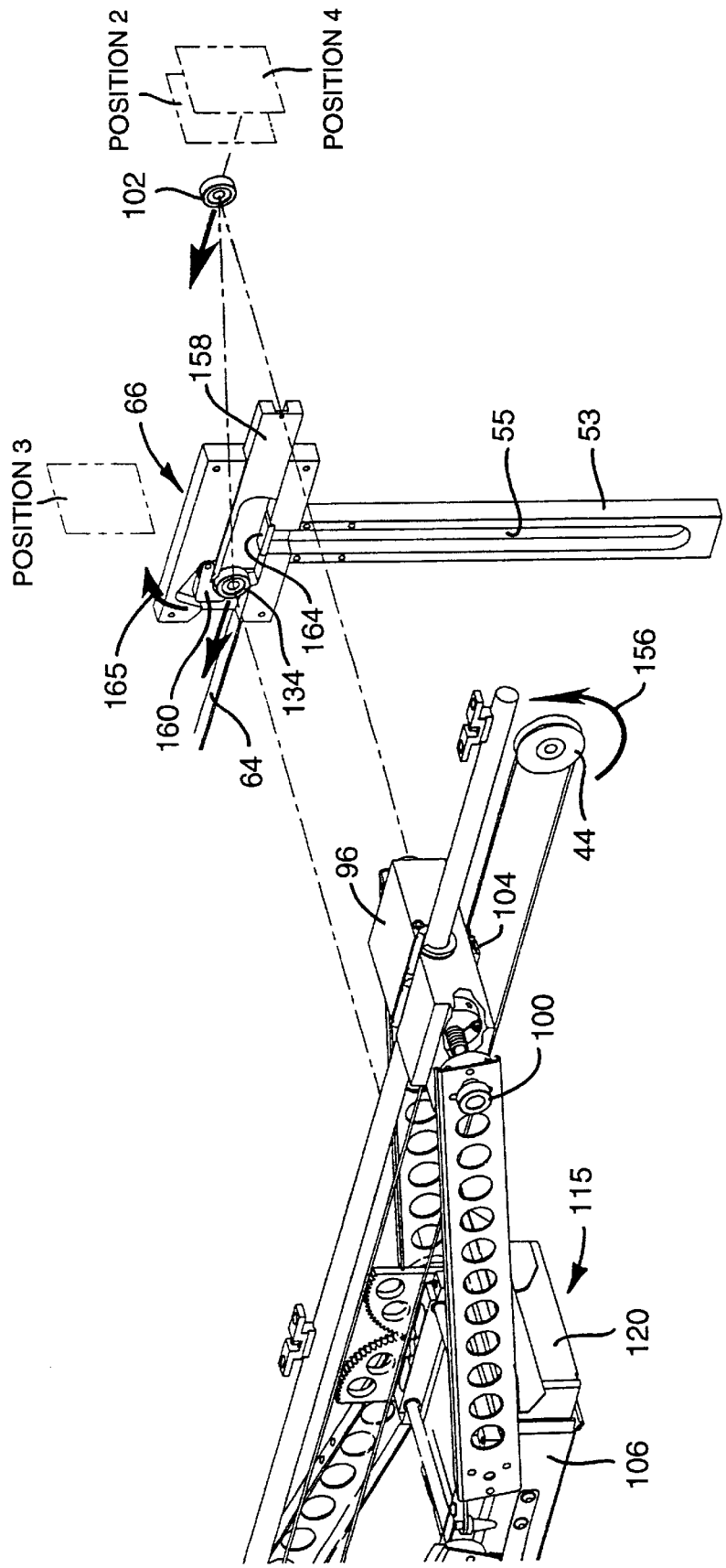
FIG. 10 is a perspective view similar to those of FIGS. 7–9 with the bin assembly carriage and a cartridge raised in preparation for a return translation from north to south cabinets, and showing the release of the trapdoor mechanism.
Figure 11B:
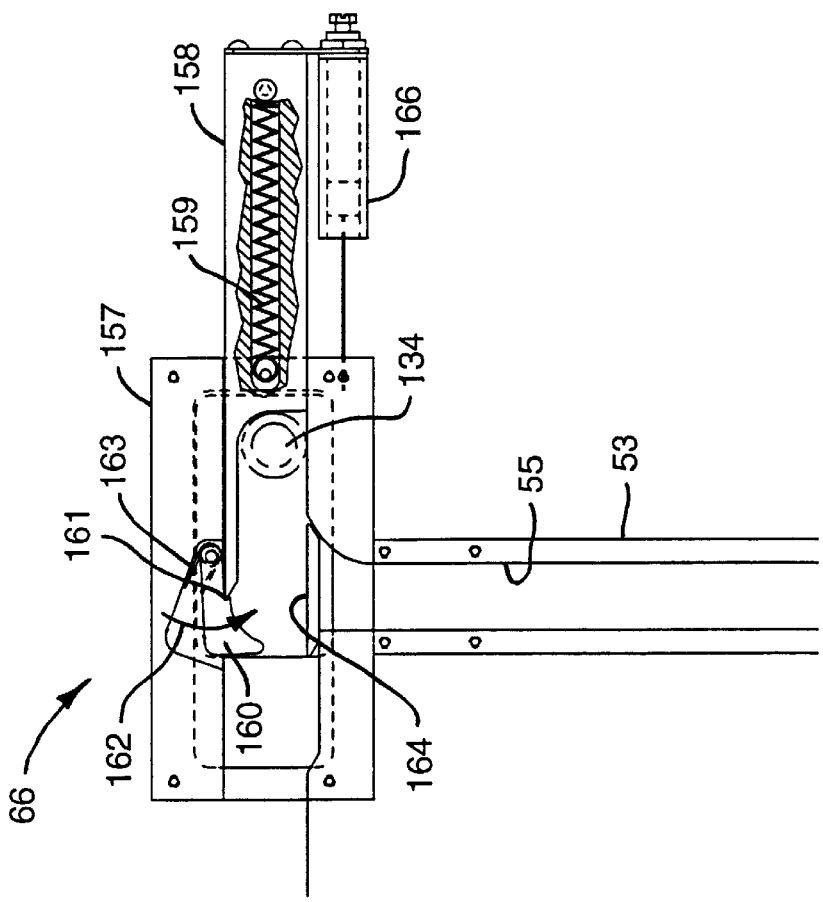
FIGS. 11A and 11B are side views with breakouts of the trapdoor mechanism of the invention showing the mechanism and its function in further detail.

As depicted in FIG. 10 as well as FIG. 11B, with the trapdoor 164 over the channel 55, as cable motion is reversed to CCW rotation (arrow 156) to drive the bearing block 96 back towards position 1, the vertical guide roller 134 rolls across the vertical guide channel 55 on the trapdoor 164, then cams the pawl 160 up (arrow 165, FIG. 10) to release the sliding member 158. The load spring 159 resets the member 158 to its left position (FIG. 8), moving the trapdoor 164 and uncovering the vertical guide channel 55 in preparation for the next cycle of the bin assembly carriage 115. The bin assembly carriage 115 then may be driven back to the south row 32 of library systems by continued CW rotation of the cable drum 40.

Figure 11A:
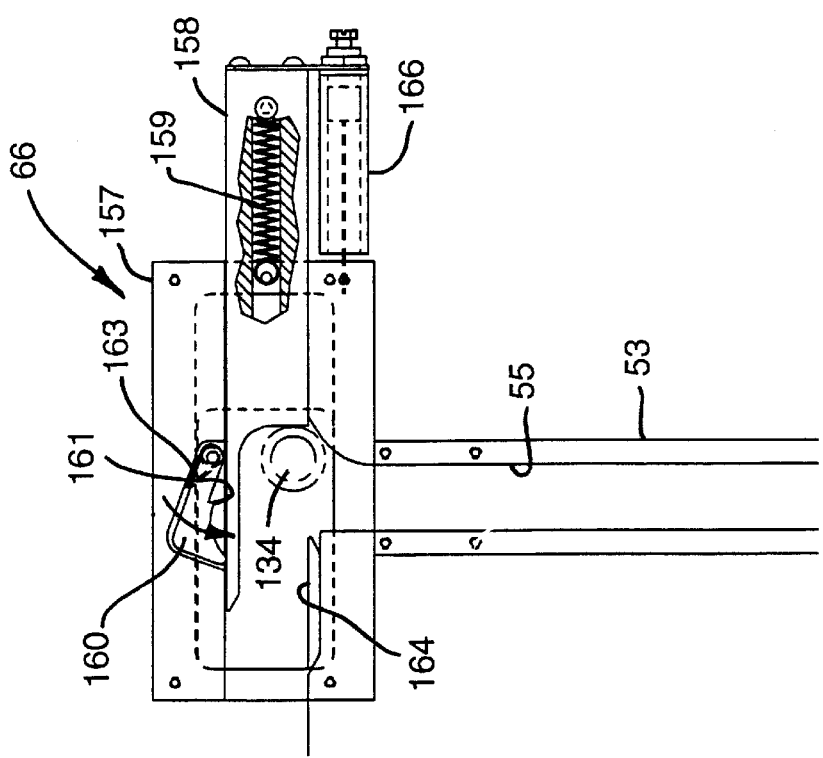

As shown in FIGS. 11A, 11B the spring 159 is mounted within a slot in the sliding member 158. In addition, a motion damping air pot 166 is attached between the sliding member 158 and the base 157 of the trapdoor mechanism 66, to cushion the movement of member 158.

As previously described, the inter-row, or north-south transfer unit (212, 214 FIG. 17) contains the movable bin assembly carriage 115 whose lower portion includes the bin assembly 106. The bin assembly is supported and guided by the two rollers 132, 134, one on each side. At the north end of its travel, the roller 134 engages and actuates the "trapdoor mechanism" 66 previously described and illustrated with the aid of FIGS. 7–11.

As illustrated in FIG. 7, when the roller 134 leaves the horizontal supporting surface of the guide rail 64 it drops abruptly into the vertical guide channel 55. Being affixed to the link (previously identified as 110) between itself and roller 102, the roller 134 pivots about roller 102 until it contacts the far wall of the vertical guide channel 55. Although not shown, the roller 132 does the same with respect to its vertical guide channel 54. This impact results in an undesirable noise, and might eventually cause damage to the rollers.

Since the bin assembly carriage 115 depends on the force of gravity for the subsequent vertical motion of the bin assembly 106 illustrated in FIG. 8, any attempts to forcefully counteract the rotation of the links would be counterproductive and decrease reliability.

A solution to this problem is illustrated in FIGS. 12A–12F, where the upper row of illustrations (12 A, C, E) illustrate the left, i.e., "west" side "trapdoor mechanism" 66, and the lower row (12 B, D, F) illustrate a new and slightly different mechanism herein termed a "roller support mechanism" 167, on the right, i.e., "east" side. The centerlines between the upper and lower illustrations join the rollers 134, 132, respectively, to show their simultaneous positions. Details of the trapdoor mechanism 66, such as pawl 160 shape and airpot 166 placement, differ slightly from that shown in FIG. 11, but the functions thereof are unchanged. Also, the roller support mechanism 167 is shown in mirror image (or as if looking through the mechanism 167 as well as through the east side of the housing 34). In addition, the figures are vertically aligned in the drawing to help illustrate the simultaneous functions, even though in reality the vertical guide channels 52, 53 and 72, 74, are staggered in position along the length of the housing 34, as described in FIG. 2.

Referring to FIGS. 12A, 12B, as the rollers 132, 134 approach the vertical guide channels 54, 55, moving from the left, the roller 132 of FIG. 12B contacts a concave pocket 168 in a spring-loaded sliding member 169 (which is otherwise similar to the sliding member 158 of the trapdoor mechanism 66). With further motion to the right, the concave pocket 168 supports the roller 132 and prevents it (and the bin assembly 106) from dropping into the vertical guide channel 54. Because the entire assembly carriage 115 is kept horizontal by the guided upper rollers 100, 102, the roller 134 of FIG. 12A is likewise prevented from dropping into its vertical guide channel 55 and impacting the side wall.

Referring next to FIGS. 12C, 12D, once beyond the vertical guide channel 54, the torsion-spring 163 of the pawl 160' of FIG. 12D rotates CCW to latch and prevent the sliding member 169 from returning to the left. Once beyond this point, roller motion can be stopped and reversed to smoothly lower the rollers 132, 134 into the respective vertical guide channels. Observe that gravity will cause the roller 132 to move downward out of the concave pocket 168 and not contact the pawl 160'. Also, in FIG. 12C, the sliding member 158 of the trapdoor mechanism 66, not being latched, will return to the position shown in FIG. 12A as the roller 134 moves smoothly down into its vertical guide channel 55.

Referring last to FIGS. 12E, 12F, to actuate the trapdoor mechanism 66, the rollers 132, 134 are raised up the vertical guide channels 54, 55 and the bin assembly carriage 115 is moved further to the right until the torsion-spring 163 of pawl 160' of FIG. 12E rotates CCW to latch and prevent its sliding member 158 from returning to the left. The sliding member 169 of FIG. 12F will also be shifted to the right, and a restraining pin 171 prevents its pawl 160' from rotating further CCW. Once beyond this point, roller motion can be reversed towards the left. As the roller 134 crosses the trapdoor 164, the roller 132 moves through the position shown in FIG. 12D where it contacts and cams its pawl 160' CW to release the sliding member 169. Then as shown in FIG. 12E, the roller 134 approaching the left end of the trapdoor 164, contacts and cams its pawl 160' CW to release its sliding member 158. Thus, both mechanisms 66 and 167 are reset, and the bin assembly carriage 115 proceeds to the opposite south end of the inter-row transfer unit.

When the bin assembly carriage 115 reaches the position 1 of FIG. 5, a full cycle of motion is completed. It should be appreciated that the "trapdoor" mechanism 66 particularly described in FIGS. 9, 10 and 11A, 11 B is necessary to prevent gravity from capturing the vertical guide roller 134 in the vertical guide channel 55, thus lowering the bin assembly carriage, since the drive means is not coupled to, and thus does not drive, the (left) bearing block 94.

Figure 13:
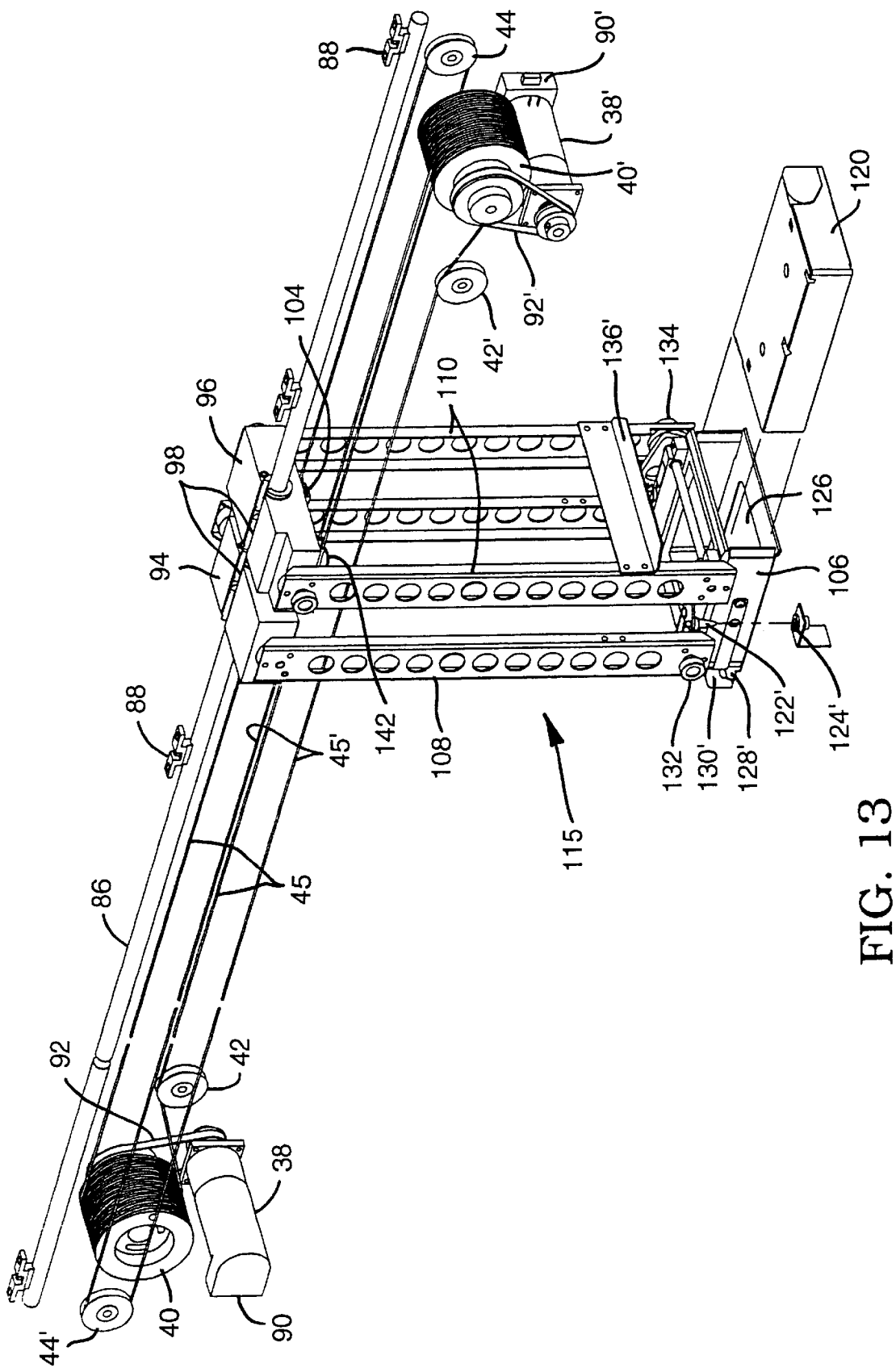
FIG. 13 is a perspective view similar to the prior figures but illustrating an alternative embodiment of the invention, with the bin assembly carriage lowered to the down position.

FIG. 13 illustrates an alternative embodiment of the present invention in which the trapdoor mechanism shown in FIGS. 7–11 is, in effect, replaced by the use of two gearmotor/cable drum/cable drive means. To this end, another bracket 36' (not shown) similar to the bracket 36 of FIG. 2, is secured within the north end of the housing 34. A second gearmotor 38' equipped with a tachometer 90', a cable drum 40' and a guide pulley 42' are mounted on the bracket 36'. The cable drum is mounted via bearings (not shown) in the bracket and is rotatably driven by the gearmotor via a timing belt 92'. A nylon-coated steel cable 45' extends from the cable drum 40' to a turnaround pulley 44' mounted at the south end of the housing 34 (FIG. 2).

Figure 14:
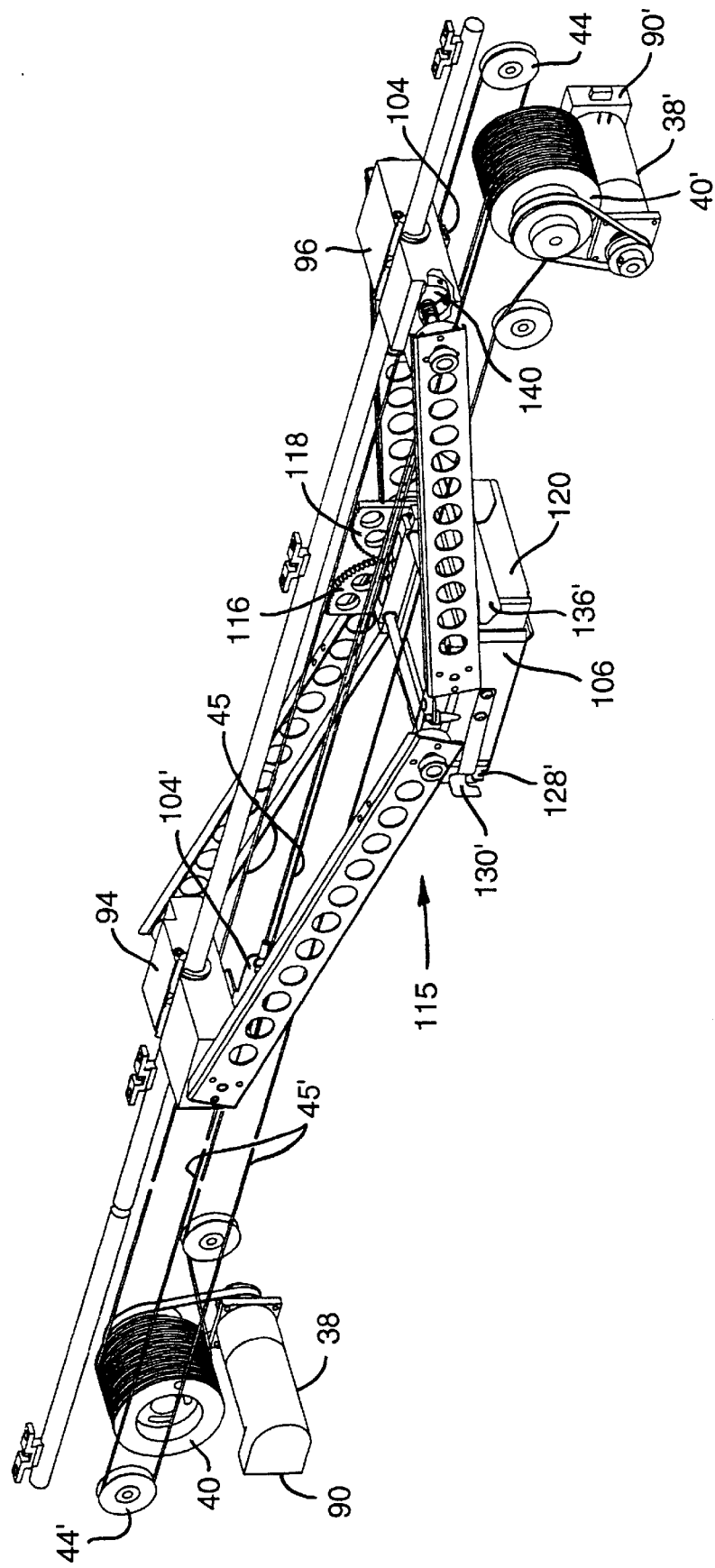
FIG. 14 is a perspective view similar to that of FIG. 13 of the alternative embodiment, with the bin assembly carriage raised to the up position.

Each of the cables 45, 45' are driven by respective tachometer equipped gearmotors and cable drums. In each drive means, the cable wraps 10 turns around the respective cable drum, entering at the top and exiting at the bottom. It then passes over the respective guide pulley, underneath the bearing blocks 94, 96, around a respective turnaround pulley on the far end of the housing, and is terminated at a respective attachment bracket 104, 104'. The bracket at 104' is shown in FIG. 14. Cable tension is provided by respective springs between each of the pairs of cable attachment points, identical to that shown in the application Ser. No. 09/293, 007. Also, each cable is anchored to its drum at a position which never winds off the drum to insure that the bearing block position is repeatable. Thus, it may be seen that each of the drive means of FIGS. 13, 14 are configured the same, and function in the same manner, as the drive means described in the FIGS. 2–10 above.

When the links 94, 96 are hanging vertically, as shown in FIG. 13, the cartridge bin assembly 106 is in the lowered position, and the cartridge 120 can be inserted or removed as shown. In this position, the alignment pin 122' mates with a fixed bushing 124' secured to the vertical member 52 or 72 in the housing 34 to insure that the bin 126 is presented to a respective cartridge handling robot in a repeatable fashion. The bin flag 128' interrupts the beam of the optical sensor 58 or 80 (FIG. 3A) to signal that the bin assembly 106 is present in the respective cabinet. When the cartridge 120 is inserted, it deflects the light leaf-spring cartridge flag 130' which interrupts the beam of the other optical sensor 60 or 82, signaling that the cartridge 120 is present in the bin assembly.

In the embodiment of FIGS. 13, 14 vertical motion is caused by moving the bearing blocks 94, 96 in opposite directions until the linkage, that is, links 108, 110, is in the position shown in FIG. 14, corresponding to 9 ½ inches of lift. The vertical guide rollers 132, 134 on each side of the cartridge bin assembly 106 run in respective vertical guide channels 54, 75 and 55, 76 in the vertical members 52, 72 and 53, 74, respectively, of the housing 34, to prevent horizontal motion during this phase. The bearing blocks 94, 96 are moved apart to provide the lift by reversing the rotation of one of the cable drums 40, 40' relative to the other, depending upon the existing direction of motion of the bin assembly carriage 115.

As the bin assembly 106 is lifted, the sheet metal cartridge retainer 136', which replaces the spring leaf retainer 136 of FIGS. 3, 4, rotates downward in front of the bin opening to capture the cartridge 120. As in the embodiment of FIGS. 3–10, four torsion springs 140 (FIG. 14) within the bearing blocks 94, 96 exert an upward force on the cartridge bin assembly carriage 115 to minimize the force the cables must exert to separate the blocks.

Once the bin assembly 106 is lifted, the gearmotors 38, 38' move both blocks 94, 96 in the same direction and at the same speed to achieve horizontal travel. The horizontal travel limits are detected by the block position flag 142 (FIGS. 3, 13) which interrupts the beam of the optical sensor 144 (FIG. 2), located at the north end of the housing, thus signaling the controller circuit, depicted in FIG. 16, to lower the bin assembly 106. During horizontal motion, the vertical guide rollers 132, 134 are captured above the horizontal rails 62, 64 (FIG. 2) extending along the inside walls of the housing 34, so that the bin assembly 106 is prevented from lowering inadvertently.

FIGS. 15A, 15B are pictorial views illustrating another embodiment of the invention for achieving the vertical up and down motions required by the inter-row transfer unit of the invention. The concept presents a minor disadvantage because it requires a larger volume in the top region of a library system which, in turn, would prevent having two inter-row transfer units attached to one DST 712 library system, such as described below in FIG. 17. However, the advantages are that this embodiment presents a simpler bin assembly carriage and that vertical and horizontal drives are isolated thereby making control somewhat simpler.

As illustrated in FIGS. 15A, 15B, a cartridge bin assembly carriage 170 includes a bin assembly 172 secured to a linkage plate 174 which in turn, is supported via a bearing block 175 from a shaft 176. FIG. 15A depicts the bin assembly 172 rotated down into the library system (arrow 173). The shaft 176 in turn is supported on bearings (not shown) at each end of the shaft at respective ends of a housing similar to that of previous description. Thus, the shaft 176 is rotatable through a 90 degree arc. The shaft 176 may be square, splined, etc. and along with bearing block 175, capable of rotating the bin assembly carriage 170 while also allowing it to move freely along the shaft 176 in an axial direction on the bearing block 175.

A loaded cartridge such as cartridge 120, is lifted clear of a respective cabinet by rotating the shaft 90 degrees (arrow 177) with an electric motor via gears (or other means for providing rotation). The bin assembly then is translated horizontally along the shaft 176, the preferred drive being a steel cable system similar to that described above in FIGS. 3–10, 12, 13. Cable attachment to the bin assembly carriage 170 is such that it is unaffected by the rotation of the bin assembly, i.e. carriage. Optical position sensing of the bin assembly carriage and of the cartridge presence is similar to that already described employing for example, fixed optical sensors in the housing and respective flags carried on the movable bin assembly 172.

Figure 16:
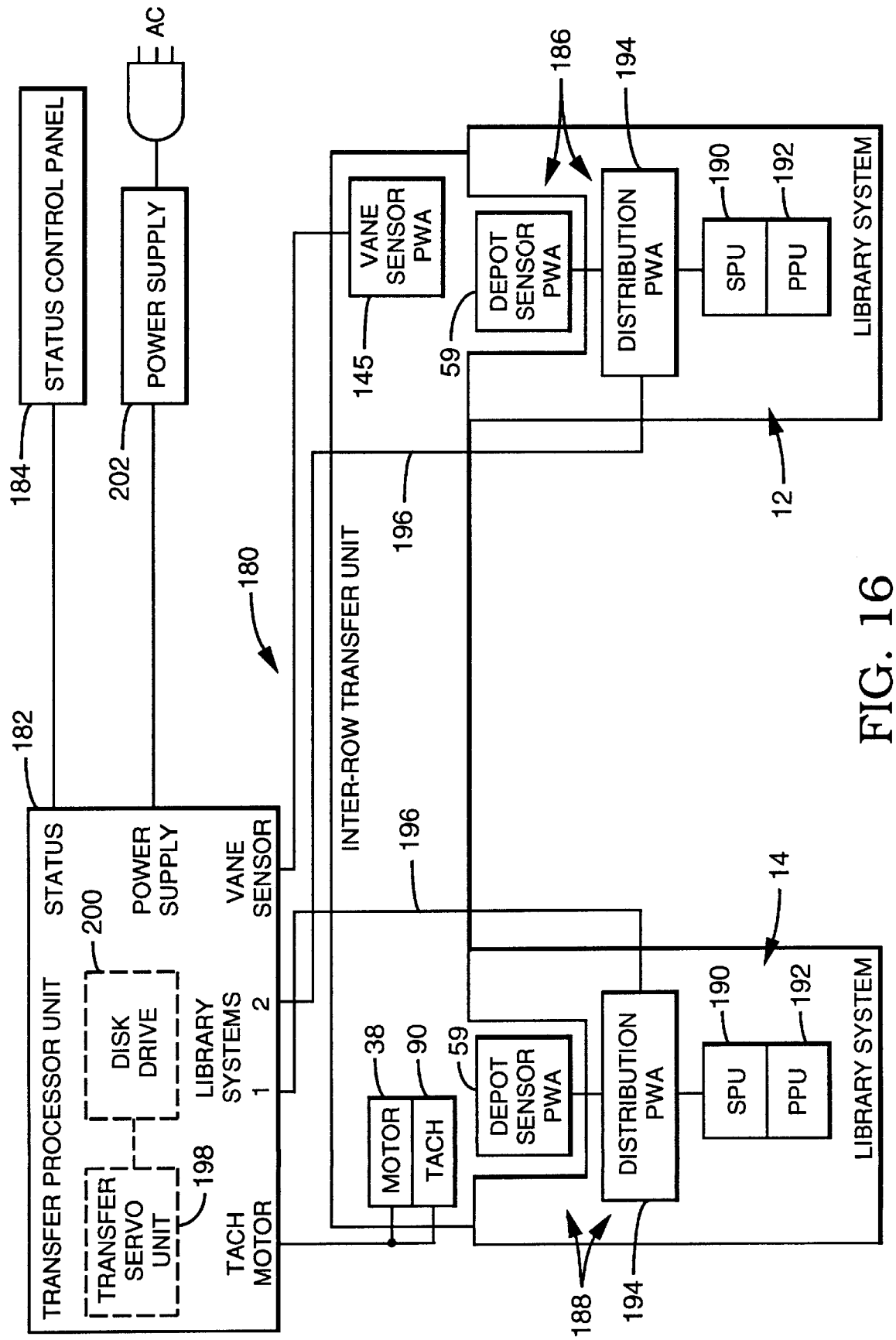
FIG. 16 is a block diagram illustrating a transfer servo circuit for sensing and controlling the movements of a movable bin assembly relative to the stop locations and respective cartridge handling robots of respective library systems.

FIG. 16 illustrates, by way of example, a transfer servo circuit 180 for sensing and controlling the movements of the respective movable bin assembly 106 (and 172) and cartridge 120 extending between two library systems 12, 14 of two rows of library systems, such as illustrated in FIGS. 1, 1A. The transfer servo circuit 180 includes a transfer processor unit (TPU) 182, a status control panel 184 and a plurality of transfer unit circuits 186, 188 associated with the respective library systems in associated cabinets.

The library systems 12, 14 typically each include a protocol processor unit (PPU) 192 and a servo processor unit (SPU) 190 which control the operation of each library system and particularly the cartridge handling robots (for example, FIG. 1, robots 24, 26) in respective library systems. While these units 192, 190 do not per se comprise part of the present invention, they do co-act closely with the inter-row transfer unit of the invention to enable the transfer of cartridges to and from library systems in different rows, via the cartridge handling robots in association with the inter-row transfer unit(s). The SPU 190 operates three servo circuits (X, Y, Z axes) in the robot circuitry, by driving the respective X, Y, Z motors which move the robot in response to feedback signals from a tachometer of each motor. The PPU 192 provides pre-programmed commands to the servo circuits of the cartridge handling robot, such as, "scan all bins to determine cartridge locations", "pull a cartridge from a certain bin and transfer it to a certain tape drive" or vice versa, etc. Such commands are delivered across interfaces between the PPU 190 and the SPU 192. The PPU 192 in turn is driven by a host computer via a standard computer interface (not shown) in a conventional configuration of a library system 12, 14.

Since the library systems 12, 14 of FIG. 16 are identical, only the system 14 is described herein by way of example. The transfer unit circuits 186–188 of the invention each include a distribution PWA board 194 with connections to the stop location, that is, the depot PWA board 59 of previous mention in FIGS. 2, 3A, to the SPU 190 and to the TPU 182. The distribution PWA board 194 is simply a passive connection board which distributes signals between the PWA board 59, the SPU 190 and the TPU 182 via a respective communication line 196 which extends from each distribution PWA board 194 to a respective input of the TPU 182. As described in FIGS. 2 and 3A, a stop location is located at the bottom of the carriage vertical guide assemblies 48, 70 in respective library systems and there are two optical LED sensor means 58, 60 and 80, 82 at each stop location. The means 60, 82 sense whether a cartridge 120 is present in the bin assembly 106, while the other optical means 58, 80 sense whether the bin assembly is in position at the stop location. That is, the optical LED sensor means 58, 80 are used to verify that the bin assembly is in fact stopped at the respective stop location.

The transfer processor unit 182 includes a transfer servo unit 198 which in turn is coupled to a disk drive 200. The status control panel 184 is coupled to a status input of the transfer processor unit 182, and AC electrical power is supplied thereto via a power supply 202 and a power supply input to operate the inter-row transfer unit(s). The status control panel 184 may comprise for example a lighted display on the front of the library system cabinet which includes a plurality of lighted indicators representing each stop location and a lighted moving icon which represents the bin assembly 106 and indicates at which stop location, that is, which library system cabinet, the bin assembly is located. The panel 184 also includes a lighted icon which indicates whether there is a cartridge 120 in the bin assembly 106.

The bin assembly 106 is positioned at specific stop locations or depots by means of a servo circuit in the transfer servo unit 198, in response to tach pulses from the tachometer 90 integral with the gearmotor 38. Accordingly, a respective digital number corresponding, for example, to a specific number of tachometer pulses, identifies a particular stop location as further described below. In turn, the respective optical LED sensor means 58, 80 of the PWA board 59 generate a single bit whose state indicates whether the bin assembly 106 is at a particular stop location. The optical LED means 60, 82 generate a single bit whose state indicates whether a cartridge 120 is or is not present in the bin assembly 106.

Control of the movement and selection functions of the inter-row transfer unit as well as of the cartridge handling robot 24, 26 in each of the library systems 12, 14 is provided by the host computer and computer interface of previous mention. For example, the host computer may direct that a specific cartridge in a library system of one row be loaded into a tape drive unit 27 (FIG. 1) in a library system in another row. To this end, the host computer communicates with the respective robot, which also communicates with the respective inter-row transfer unit. The inter-row transfer unit commands the robot of a library system in one row to retrieve the desired cartridge 120 from the respective stationary bin array 20 or 22 and load it in the bin assembly 106 at the respective stop location. The inter-row transfer unit then moves the cartridge to the stop location of the library system in another row. The inter-row transfer unit then commands the respective robot to retrieve the cartridge from the bin assembly and, usually, to load it into a bin assembly of an inter-cabinet transfer unit which transports the cartridge to, for example, a desired tape drive unit 27. See the application Ser. No. 09/293,007 of previous mention for a description of the inter-cabinet transfer unit. The cooperative operation of the inter-row and inter-cabinet transfer units is described in FIG. 17.

The gearmotor 38 and integral tachometer 90 are coupled to a tachometer/motor input of the transfer processor unit 182, whereby power is supplied to the gearmotor and tach pulses are supplied from the tachometer 90 to the TPU 182. A signal generated by the block position flag 142 (FIGS. 3, 4) interrupting the beam of the optical sensor 144 (FIG. 2), is supplied from the vane sensor PWA board 145 to a vane sensor input of the TPU 182 to calibrate the tachometer 90.

To this end, the tachometer 90 is an incremental tach which, as is generally known, provides a large number of tach pulses which are counted by for example an up/down counter. To initialize the counter as when first "waking up" the system, the bin assembly carriage 115, 170 is translated under a preset slow speed to the north end of the housing 34 under control of the tachometer 90, where the block position flag 142 (FIGS. 3, 4) interrupts the beam of the optical vane sensor 144. At this point, the mechanical position of the carriage is precisely known, whereupon a selected known digital number is loaded into the counter. Thereafter the precise position of the bin assembly carriage is known in terms of tach counts wherein, for example, the positions 1, 2, 3, 4 of previous discussion in FIGS. 5–10 are precisely known in terms of tach counts. It follows that the signal supplied by the tachometer 90 to the TPU 182 enables the latter unit to stop the carriage 115, 170 at precisely the proper mechanical positions.

Figure 17:
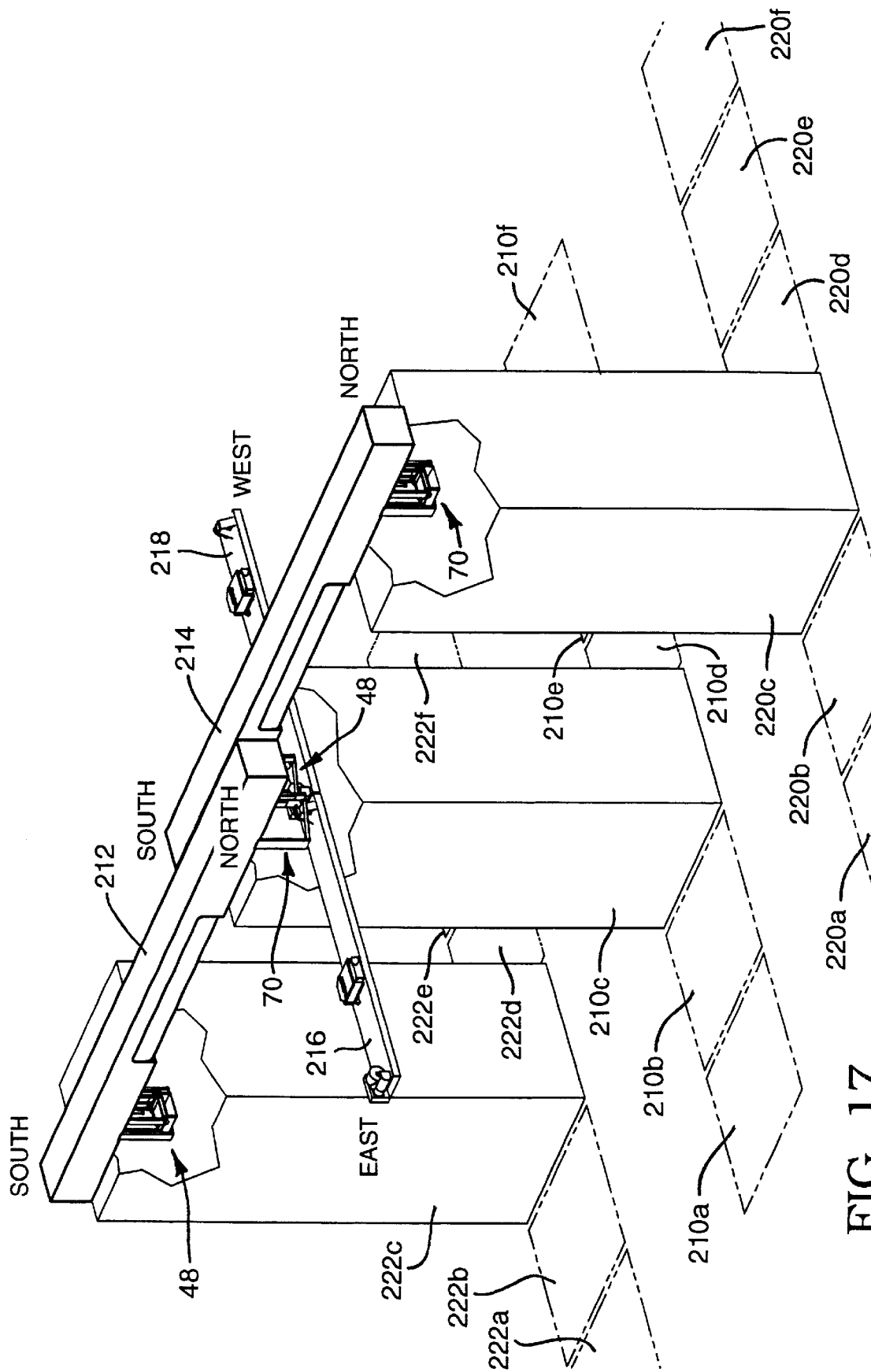
FIG. 17 is a perspective view, partially in phantom line, illustrating a combined installation of inter-row transfer units of the invention with inter-cabinet transfer units of the aforementioned application Ser. No. 09/293,007, to provide a large mass storage system.

FIG. 17 illustrates a multi-row assemblage of for example DST 712 library systems of previous mention, which, in combination with the inter-row transfer unit of the present invention and the inter-cabinet transfer unit of the application Ser. No. 09/293,007, form a large, efficient mass storage system. For clarity, only the base footprints for some of the assembled library systems are shown. A central (master) library system 210c corresponding for example to the library system 14 of FIGS. 1, 1A and 16, is selected as the junction at which respective overlapping ends of two inter-row transfer units 212, 214, and abutting ends of two inter-cabinet transfer units 216, 218, are installed. The mass storage system thus comprises the master library system 210c in a middle row of library systems 210a through 210f, with a back row of library systems 220a–220f and a front row of library systems 222a–222f, operatively coupled together by the inter-row and inter-cabinet transfer units 212, 214 and 216, 218. Although not shown here, the back and front rows of library systems 220, 222 also have respective pairs of east-west inter-cabinet transfer units extending between them as illustrated by the units 216, 218, thereby connecting the cartridge transferring capabilities of all of the library 210, 220 and 222 systems together. The south and north ends of the inter-row transfer units 212, 214, respectively, thus extend from the library system 210c to mount within the library systems 222c and 220c. As fully described in the aforementioned application Ser. No. 09/293, 007, the abutting ends of the east-west inter-cabinet transfer units 216, 218 are mounted within the cabinet of library system 210c below the carriage vertical guide assemblies (48, 70) of the north-south inter-row transfer units 212, 214. It follows that at such time as the respective bin assemblies of the transfer units are situated at the respective depots or stop locations in the library system 210c, they are accessible to its respective cartridge handling robot. Thus, depending upon the commands delivered from the transfer processor unit 182 of FIG. 16, the robot of each library cabinet 210c, 220c, 222c, provides the means for transferring a cartridge north-south and south-north between inter-row transfer units and thus between rows of library systems, or between inter-row and inter-cabinet transfer units thus transferring a cartridge to a library system in a respective row, or between inter-cabinet transfer units to allow east-west and west-east transfer of the cartridge along an entire row of library systems.

As is readily apparent from FIG. 17, there is almost unlimited combinations and arrangements of library systems, and respective combinations of inter-row and inter-cabinet transfer units which can be assembled together, as determined by the number of library systems and the footprint required at a customer's site. Since each library system and the associated portion of the transfer control circuitry is a stand alone unit, the present invention provides the decided advantage that one or more library systems readily may be added or deleted from an overall mass storage installation without disturbing the rest of the library systems or the transfer servo/control circuits of the installation.

Although the invention has been described herein relative to specific embodiments, various additional features and advantages will be apparent from the description and drawings. Thus the scope of the invention is defined by the following claims and their equivalents.

What is claimed is:

1. Apparatus for transferring tape cartridges between rows of cartridge library systems having respective cartridge handling robots and bin arrays, comprising:

a bin assembly carriage for vertically and horizontally transporting a tape cartridge;

support means for translatably supporting the bin assembly carriage between the library systems;

a bin assembly integral with the bin assembly carriage for capturing and releasing a cartridge;

a mechanism integral with the bin assembly carriage for providing vertical translation of the bin assembly into and out of the library systems; and drive means supported by the support means for imparting the vertical translation to the mechanism as well as for providing the horizontal translation of the bin assembly carriage between the rows of library systems, wherein each cartridge handling robot moves a cartridge between the bin assembly and a bin or between the bin and the bin assembly.

2. The apparatus of claim 1 wherein:

the support means include an elongated housing and an elongated shaft supported by the housing and extending between the rows of library systems; and the mechanism includes bearing block means slidably supported on the elongated shaft.

3. The apparatus of claim 2 wherein:

the mechanism includes counter-rotating members pivotally secured to the bin assembly and suspended from respective bearing blocks of the bearing block means; and said drive means is coupled to at least one bearing block for causing translation of the counter-rotating members in opposite directions to provide an upward as well as downward vertical translation of the bin assembly.

4. The apparatus of claim 2 wherein:

the drive means include a motor, a cable drum secured to the support means and rotated by the motor, and a cable secured to a bearing block and having several wraps of the cable about the cable drum such that selected rotation of the cable drum causes the vertical translation of the bin assembly relative to the library systems and the horizontal translation of the bin assembly carriage between the rows of library systems.

5. The apparatus of claim 4 wherein:

said cable is coupled to a single bearing block of the bearing block means and rotation of the cable drum in a first direction causes upward vertical translation of the bin assembly from a first library system, with further rotation in the first direction providing the horizontal translation of the raised bin assembly to a second library system, whereupon cable drum rotation in a second opposite direction causes the bin assembly to translate vertically downward into the second library system.

6. The apparatus of claim 5 wherein rotation of the cable drum in the first direction causes upward vertical translation of the bin assembly from the second library system, whereupon rotation in the second opposite direction causes the horizontal translation of the raised bin assembly back towards the first library system.

7. The apparatus of claim 1 wherein the library systems include stationary bin matrices which are addressed by a cartridge handling robot, including:

a stop location located at each bin assembly stopping point, wherein the moveable bin assembly appears to the cartridge handling robot as another stationary bin in the respective bin matrix, and including sensor means for detecting the presence of the bin assembly at the pseudo stationary bin location in the respective library system, as well as the presence of a cartridge in the bin assembly.

8. The apparatus of claim 1 including:

control means for controlling the vertical and horizontal movements of the bin assembly carriage between library systems while coordinating the bin assembly movements with the cartridge handling robot of each library system.

9. The apparatus of claim 1 including:

first and second vertical guide means integral with the support means and depending into respective library systems for vertically guiding the bin assembly into and out of the library systems.

10. The apparatus of claim 9 including:

a trapdoor mechanism mounted within the support means in register with the second vertical guide means, for allowing vertical translation of the bin assembly into and out of the second vertical guide means, and actuable by subsequent horizontal translation of the bin assembly carriage to prevent the capture of the bin assembly carriage by the second vertical guide means when returning the carriage horizontally back to the first vertical guide means.

11. An inter-row transfer apparatus for transferring tape cartridges and the like between generally parallel rows of a front-to-back configuration of tape library cabinets, wherein the cabinets have a cartridge handling robot and a bin array, comprising:

a bin assembly carriage for vertically and horizontally transporting a tape cartridge;

support means for translatably supporting the bin assembly carriage across the tops of the library cabinets to provide horizontal transfer of the bin assembly carriage between first and second library cabinets;

said bin assembly carriage including a bin assembly for capturing the cartridge and a pair of counter-rotating link structures coupled to the bin assembly for translation by the support means;

said link structures being pivotable where secured to the bin assembly so as to allow vertical translation of the bin assembly and cartridge; and drive mechanism integral with the support means and coupled to the link structures for imparting both the counter-rotation of the link structures to vertically translate the bin assembly into and from the tops of the library cabinets and to horizontally translate the bin assembly carriage between the library cabinets, whereby each cartridge handling robot moves a cartridge between the bin assembly and a bin or between the bin and the bin assembly.

12. The apparatus of claim 11 wherein:

said support means include an elongated housing and an elongated shaft supported by said housing;

said bin assembly carriage further includes bearing blocks secured to the upper ends of respective link structures and supported in translatable relation by the elongated shaft; and said drive mechanism is coupled to a bearing block to spread apart and close together the bearing blocks to impart the counter-rotation to the link structures so as to provide the raised and lowered vertical translations, respectively, as well as the horizontal translation, of the bin assembly.

13. The apparatus of claim 12 wherein:

said drive mechanism include at least one gearmotor and a drum having a cable secured thereto and extending therefrom to a bearing block/link structure, wherein motion of the cable in a first direction spreads the bearing blocks to vertically raise the bin assembly and motion of the cable in an opposite direction allows closure of the link structures to vertically lower the bin assembly.

14. The apparatus of claim 13 including:
a control circuit coupled to the drive mechanism for controlling the horizontal translation of the bin assembly carriage and the vertical translation of the bin assembly into and from the library systems, while coordinating the bin assembly movements and handling of the tape cartridges with the cartridge handling robots of respective library systems.

15. The apparatus of claim 11 including:
a trapdoor mechanism integral with the support means at a position vertically above the second library cabinet and configured to allow vertical translation of the bin assembly to and from the second library cabinet, and thence actuable by movement of the bin assembly carriage to prevent vertical translation again of the bin assembly during subsequent horizontal translation of the bin assembly carriage back to the first library cabinet.

16. The apparatus of claim 15 wherein:
the drive mechanism include a gearmotor, a cable drum rotatable by the gearmotor, and a cable coupled to the cable drum and extending to attach to the link structure closest to the second library cabinet, for imparting motion in a first direction to spread the link structures and vertically raise the bin assembly and motion in a second opposite direction to allow closure of the link structures to vertically lower the bin assembly.

17. The apparatus of claim 16 wherein:
continued cable motion in the first direction provides horizontal translation of the bin assembly from the first to the second library cabinet, while motion in the second opposite direction provides horizontal translation back to the first library cabinet.

18. The apparatus of claim 16 wherein:
cable motion in the first direction locates the bin assembly carriage over the second library cabinet;
cable motion in the second opposite direction allows the bin assembly to lower into the second library cabinet for access by a respective cartridge handling robot;
cable motion again in the first direction first raises the bin assembly and then slightly horizontally translates the bin assembly carriage to close the trapdoor mechanism;
whereupon cable motion again in the second opposite direction horizontally translates the bin assembly carriage over the closed trapdoor mechanism and back towards the first library cabinet; and
movement of the bin assembly carriage past the trapdoor mechanism resets the mechanism to an open condition.

19. The apparatus of claim 18 including:
vertical guide channels integral with the housing and extending down into respective library systems; and
vertical guide rollers rotatably secured to the bin assembly for vertical movement within respective vertical guide channels to provide the bin assembly vertical translation in response to the drive mechanism.

20. Apparatus for transferring a tape cartridge between rows of cartridge library systems, each having respective stationary bin arrays and cartridge handling robots, comprising:
support means extending between respective library systems in the rows of library systems;
a movable bin assembly carriage slidably supported by said support means for horizontally and vertically transporting the cartridge between respective library systems of the rows;
a bin assembly integral with the bin assembly carriage for carrying the cartridge;
drive mechanism secured to the support means for both horizontally transporting the bin assembly carriage along the support means and vertically translating the bin assembly into and from the respective library systems at the corresponding ends of the support means; and
stop locations corresponding to a pseudo stationary bin location of a stationary bin array of a respective library system, at which pseudo stationary bin location a respective cartridge handling robot has access to the moveable bin assembly, whereby each cartridge handling robot moves a cartridge between the bin assembly and a bin or between the bin and the bin assembly.

21. The apparatus of claim 20 wherein:
the cartridge maintains a constant orientation relative to the cartridge handling robots and the bin assembly during the time the cartridges are being loaded and retrieved.

22. The apparatus of claim 20 wherein the support means include:
a housing extending over the tops of the library systems the length of the support means;
an elongated shaft supported within the housing; and
support rails secured within the housing length for stabilizing the horizontal transport of the bin assembly carriage over the tops of the library systems.

23. The apparatus of claim 22 wherein the bin assembly carriage includes:
a pair of bearing blocks slidably supported on the elongated shaft;
linkage means pivotally suspended on respective bearing blocks and pivotally supporting the bin assembly; and
said drive mechanism being attached to at least one bearing block so as to spread the bearing blocks apart to vertically raise the bin assembly with movement in a first horizontal direction, while allowing the bearing blocks to close together to lower the bin assembly with movement in an opposite horizontal direction, and to provide the horizontal transport of the bin assembly carriage with either direction of movement.

24. The apparatus of claim 23 including:
vertical guide channels integral with the housing and extending down into respective library systems; and
vertical guide rollers rotatably secured to the bin assembly for vertical movement within respective vertical guide channels to provide the bin assembly vertical translation in response to the drive mechanism.

25. The apparatus of claim 20 wherein the drive mechanism include:
a gearmotor secured within a first end of the support means;
a cable drum rotatably coupled to the gearmotor;
a turnaround pulley rotatably mounted at the opposite end of the support means; and
a cable wrapped about, and secured to, the cable drum and extending therefrom along the support means to the turnaround pulley and attached to the bin assembly carriage.

26. The apparatus of claim 25 wherein the drive means include:
a second gearmotor and cable drum mounted at said opposite end of the support means;

a second turnaround pulley rotatably mounted at said first end of the support means; and a second cable wrapped about the second cable drum and extending about the second turnaround pulley, and attached to the bin assembly carriage;

wherein opposite rotations of the cable drums raises or lowers the bin assembly, and similar rotations thereof provide horizontal translation of the bin assembly carriage.

27. The apparatus of claim 20 including:

transfer control/servo means for controlling the drive mechanism's vertical and horizontal movements of the bin assembly carriage between library systems while coordinating the bin assembly movements with the handling of tape cartridges by the cartridge handling robots of the library systems.

28. The apparatus of claim 27 wherein:

the stop locations include sensor means for detecting the pseudo stationary presence of the moveable bin assembly and of a cartridge in the bin assembly; and said sensor means of each stop location are coupled to the transfer control/servo means.

29. The apparatus of claim 28 wherein:

the sensor means include a bin flag on the bin assembly and a bin flag sensor located at a stop location for detecting the presence of the bin flag, and a cartridge flag on the bin assembly and a cartridge flag sensor located at the stop location for detecting the presence of the cartridge flag.

30. The apparatus of claim 20 wherein:

the support means include vertical guide means extending down into respective library systems at opposite ends of the support means;

the drive mechanism include a gearmotor/cable drum means mounted in a first end of the support means;

the bin assembly carriage includes a pair of bearing blocks slidably supported within the support means, and linkage means pivotably suspended on respective bearing blocks and pivotably supporting the bin assembly;

vertical guide rollers rotatably secured to the bin assembly for vertical movement within respective vertical guide means; and said gearmotor/cable drum means including a cable secured to one of the bearing blocks such that rotation of the cable drum in a first direction causes upward vertical translation of the bin assembly along a first of the vertical guide means, with further rotation in the first direction causing the bearing blocks to spread apart to raise the bin assembly from the first vertical guide means and thence provide the horizontal translation of the bin assembly to a second library system, whereupon cable drum rotation in a second opposite direction causes the bin assembly to translate vertically downward into the second library system via lowering of the vertical guide rollers along a second of the vertical guide means.

31. The apparatus of claim 30 including:

a trapdoor mechanism mounted within a second end of the support means in register with the second vertical guide means;

wherein rotation of the cable drum in the first direction causes upward vertical translation of the bin assembly along the second vertical guide means and thence cause spreading of the bearing blocks to force the bin assembly carriage to close off the second vertical guide means via the trapdoor mechanism, whereupon cable drum rotation in the second opposite direction causes the bin assembly carriage to translate horizontally over the closed off second vertical guide means back to the first library system; and wherein the bin assembly carriage translation resets the trapdoor mechanism to re-open the second vertical guide means.

32. The apparatus of claim 20 wherein:

a second apparatus formed of the support means, the movable bin assembly carriage, the bin assembly and the drive means, is mounted at one end to one of the library systems in which the first support means is mounted and extends to a library system in a third row of library systems, for transferring a cartridge between three rows of library systems.

33. Apparatus for transferring a tape cartridge between rows of cartridge library systems, each having a stationary bin array and a cartridge handling robot, comprising:

a housing extending over library systems in respective rows of library systems, and including an elongated shaft, horizontal guide rails, and vertical guide means integral with the housing and extending down into a respective library system in register with respective stationary bin arrays;

a bin assembly carriage formed of a pair of bearing blocks slidably supported on the shaft, linkage pivotally supported from the bearing blocks and a bin assembly for capturing, moving and releasing the tape cartridge pivotally attached to the linkage;

drive means including a cable drum secured within one end of the housing and a cable attached to at least one bearing block, for imparting both horizontal and vertical translations to the bin assembly and cartridge depending upon the direction of rotation of the cable drum; and a trap door mechanism secured within the opposite end of the housing in register with a respective vertical guide means and actuated by horizontal movement of the bin assembly carriage after vertical translation of the bin assembly from the vertical guide means, to allow horizontal translation of the bin assembly carriage in a reverse direction over the vertical guide means in response to an opposite direction of rotation of the cable drum, whereby each cartridge handling robot moves a cartridge between the bin assembly and a bin or between the bin and the bin assembly.

34. The apparatus of claim 33 wherein the drive means include:

a motor for rotating the cable drum;

wherein motion of the cable in a first direction initiates upward vertical translation of the bin assembly from a first library system via a first of the vertical guide means with further cable motion in the first direction causing the bearing blocks to spread apart to raise the bin assembly into the housing and thence to translate the bin assembly carriage into the trapdoor mechanism at a second library system; and whereupon cable motion in a second opposite direction causes the bin assembly to move vertically downward into the second library system guided by a second of the vertical guide means.

35. The apparatus of claim 34 wherein:

said trapdoor mechanism is secured in register with the second vertical guide means;

wherein motion of the cable in the first direction initiates the vertical translation of the bin assembly upward via the second vertical guide means with further motion in the first direction causing spreading of the bearing blocks to raise the bin assembly into the housing and thence to close the trapdoor mechanism of the second vertical guide means;

whereupon cable motion in the second opposite direction horizontally translates the bin assembly carriage over the closed-off second vertical guide means back towards the first library system; and wherein the horizontal translation of the bin assembly carriage resets the trapdoor mechanism to re-open the second vertical guide means.

36. The apparatus of claim 33 including:

sensor means secured to the vertical guide means in each library system and in the bin assembly, for detecting the presence of the bin assembly and also the presence of a cartridge in the bin assembly; and control means coupled to the sensor means for directing the horizontal and vertical translations of the bin assembly via the drive means, and of the cartridge handling robots in coordination with the bin assembly movements.

37. The apparatus of claim 33 including:

a roller support mechanism secured within the opposite end of the housing opposite the trapdoor mechanism and in register with the respective vertical guide means and adapted to support the bin assembly carriage to prevent the carriage and bin assembly from dropping into the respective vertical guide means as the carriage passes the trap door mechanism.

38. Apparatus for transferring tape cartridges between rows of cartridge library systems having respective stationary bin matrices and a cartridge handling robot disposed to address each stationary bin in a respective stationary bin matrix, comprising:

a bin assembly carriage including a bin assembly integral therewith for moving a tape cartridge both vertically and horizontally, wherein the thusly moveable bin assembly appears to the cartridge handling robot as another stationary bin in the respective stationary bin matrix so as to be similarly addressed by the cartridge handling robot;

support means for translatably supporting the bin assembly carriage between the library systems;

a linking mechanism pivotally coupling the bin assembly within the bin assembly carriage for providing vertical translation of the bin assembly into and out of the library systems; and drive mechanism supported by the support means for imparting both the vertical translation to the bin assembly via the linking mechanism as well as the horizontal translation of the bin assembly carriage between the rows of library systems, whereby each cartridge handling robot moves a cartridge between the bin assembly and a bin or between the bin and the bin assembly.

39. Apparatus for transferring tape cartridges between rows of cartridge library systems having respective stationary bin matrices and a cartridge handling robot, comprising:

a bin assembly carriage for vertically and horizontally transporting a tape cartridge;

support means secured above the rows to respective library systems for translatably supporting the bin assembly carriage above and between the library systems;

a bin assembly moveable with the bin assembly carriage and addressable by the cartridge handling robot for capturing and releasing a cartridge;

a linkage mechanism integral with the bin assembly carriage for providing vertical translation of the bin assembly into and out of the tops of the library systems; and drive mechanism supported by the support means for imparting both the vertical translation to the linkage mechanism as well as the horizontal translation of the bin assembly carriage above and between the rows of library systems, whereby each cartridge handling robot moves a cartridge between the bin assembly and a bin or between the bin and the bin assembly.

* * * * *